US012056925B2

(12) United States Patent
Geiss et al.

(10) Patent No.: US 12,056,925 B2
(45) Date of Patent: Aug. 6, 2024

(54) DETERMINING REGIONS OF INTEREST FOR PHOTOGRAPHIC FUNCTIONS

(71) Applicant: Google LLC, Mountain View, CA (US)

(72) Inventors: Ryan Geiss, San Jose, CA (US); Ruiduo Yang, Sunnyvale, CA (US); Marc Levoy, Standford, CA (US)

(73) Assignee: Google LLC, Mountain View, CA (US)

( * ) Notice: Subject to any disclaimer, the term of this patent is extended or adjusted under 35 U.S.C. 154(b) by 448 days.

(21) Appl. No.: 17/299,188

(22) PCT Filed: Jan. 15, 2019

(86) PCT No.: PCT/US2019/013601
§ 371 (c)(1),
(2) Date: Jun. 2, 2021

(87) PCT Pub. No.: WO2020/149829
PCT Pub. Date: Jul. 23, 2020

(65) Prior Publication Data
US 2022/0076018 A1    Mar. 10, 2022

(51) Int. Cl.
*G06K 9/62*        (2022.01)
*G06N 20/00*       (2019.01)
(Continued)

(52) U.S. Cl.
CPC .............. *G06V 20/35* (2022.01); *G06N 20/00* (2019.01); *G06V 10/56* (2022.01); *H04N 23/80* (2023.01);
(Continued)

(58) Field of Classification Search
CPC ........ G06V 20/35; G06V 10/56; G06V 40/16; G06N 20/00; H04N 23/80; H04N 23/61;
(Continued)

(56) References Cited

U.S. PATENT DOCUMENTS 10,713,794 B1 *  7/2020  He .......................... G06N 3/084
11,468,285 B1 * 10/2022  Tang ................. B60W 60/0027

FOREIGN PATENT DOCUMENTS

WO        2016/160221        10/2016

OTHER PUBLICATIONS

Girshick et al., "Rich Feature Hierarchies for Accurate Object Detection and Semantic Segmentation Tech Report (v5)," Cornell University Library, arXiv:1311.2524v5, Oct. 22, 2014, 21 pages.
(Continued)

*Primary Examiner* — Xin Jia
(74) *Attorney, Agent, or Firm* — McDonnell Boehnen Hulbert & Berghoff LLP

(57) ABSTRACT

Apparatus and methods related to photography are provided. A computing device can receive an input image. An object detector of the computing device can determine an object region of interest of the input image that is associated with an object detected in the input image. A trained machine learning algorithm can determine an output photographic region of interest for the input image based on the object region of interest and the input image. The machine learning algorithm can be trained to identify an output photographic region of interest that is suitable for use by a photographic function for image generation. The computing device can generate an output related to the output photographic region of interest.

20 Claims, 13 Drawing Sheets

(51) Int. Cl.
*G06V 10/56* (2022.01)
*G06V 20/00* (2022.01)
*H04N 23/80* (2023.01)

(52) U.S. Cl.
CPC ............... *G06T 2207/20081* (2013.01); *G06T 2207/20084* (2013.01)

(58) Field of Classification Search
CPC ...... H04N 23/611; H04N 23/67; H04N 23/73; H04N 23/75; H04N 23/76; G06T 2207/20081; G06T 2207/20084
See application file for complete search history.

(56) References Cited

OTHER PUBLICATIONS

Wu et al., "Active Control of Camera Parameters for Object Detection Algorithms," Cornell University Library, arXiv:1705.95685v1, May 16, 2017, 7 pages.
Yan et al., "Automatic Photo Adjustment Using Deep Neural Networks," Cornell University Library, arXiv:1412.7725v2, May 16, 2015, 15 pages.

* cited by examiner

DETERMINING REGIONS OF INTEREST FOR PHOTOGRAPHIC FUNCTIONS

This application is a national stage application under 35 U.S.C. § 371 of International Application No. PCT/US2019/013601, filed Jan. 15, 2019, the disclosure of which is explicitly incorporated by reference herein in its entirety.

BACKGROUND

Many modern computing devices, including mobile phones, personal computers, and tablets, include image capture devices, such as still and/or video cameras. The image capture devices can capture images, such as images that include people, animals, landscapes, and/or objects. Some image capture devices and/or computing devices utilize automated photographic functions, such as automatic exposure (AE), automatic white balance (AWB), and automatic focus (AF) functions, in capturing and generating images. After an image has been captured and generated, the image can be saved, displayed, transmitted, printed to paper, and/or otherwise utilized.

SUMMARY

In one aspect, a computer-implemented method is provided. A computing device receives an input image. An object detector of the computing device is utilized to determine an object region of interest of the input image. The object region of interest of the input image is associated with an object detected in the input image. A trained machine learning algorithm is used to determine an output photographic region of interest for the input image based on the object region of interest and the input image. The machine learning algorithm is trained to identify a photographic region of interest that is suitable for use by a photographic function for image generation. The computing device generates an output that is related to the output photographic region of interest.

In another aspect, a computing device is provided. The computing device includes: one or more processors; and one or more computer readable media having computer-readable instructions stored thereon that, when executed by the one or more processors, cause the computing device to carry out functions. The functions include: receiving an input image; utilizing an object detector of the computing device to determine an object region of interest of the input image that is associated with an object detected in the input image; determining an output photographic region of interest for the input image based on the object region of interest and the input image using a trained machine learning algorithm, where the machine learning algorithm is trained to identify a photographic region of interest that is suitable for use by a photographic function for image generation; and generating an output related to the output photographic region of interest.

In another aspect, a computing device is provided. The computing device includes: means for receiving an input image; means for utilizing an object detector of the computing device to determine an object region of interest of the input image that is associated with an object detected in the input image; means for determining an output photographic region of interest for the input image based on the object region of interest and the input image using a trained machine learning algorithm, where the machine learning algorithm is trained to identify a photographic region of interest that is suitable for use by a photographic function for image generation; and means for generating an output related to the output photographic region of interest.

In another aspect, an article of manufacture is provided. The article of manufacture includes one or more computer readable media having computer-readable instructions stored thereon that, when executed by one or more processors of a computing device, cause the computing device to carry out functions. The functions include: receiving an input image; utilizing an object detector of the computing device to determine an object region of interest of the input image that is associated with an object detected in the input image; determining an output photographic region of interest for the input image based on the object region of interest and the input image using a trained machine learning algorithm, where the machine learning algorithm is trained to identify a photographic region of interest that is suitable for use by a photographic function for image generation; and generating an output related to the output photographic region of interest.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
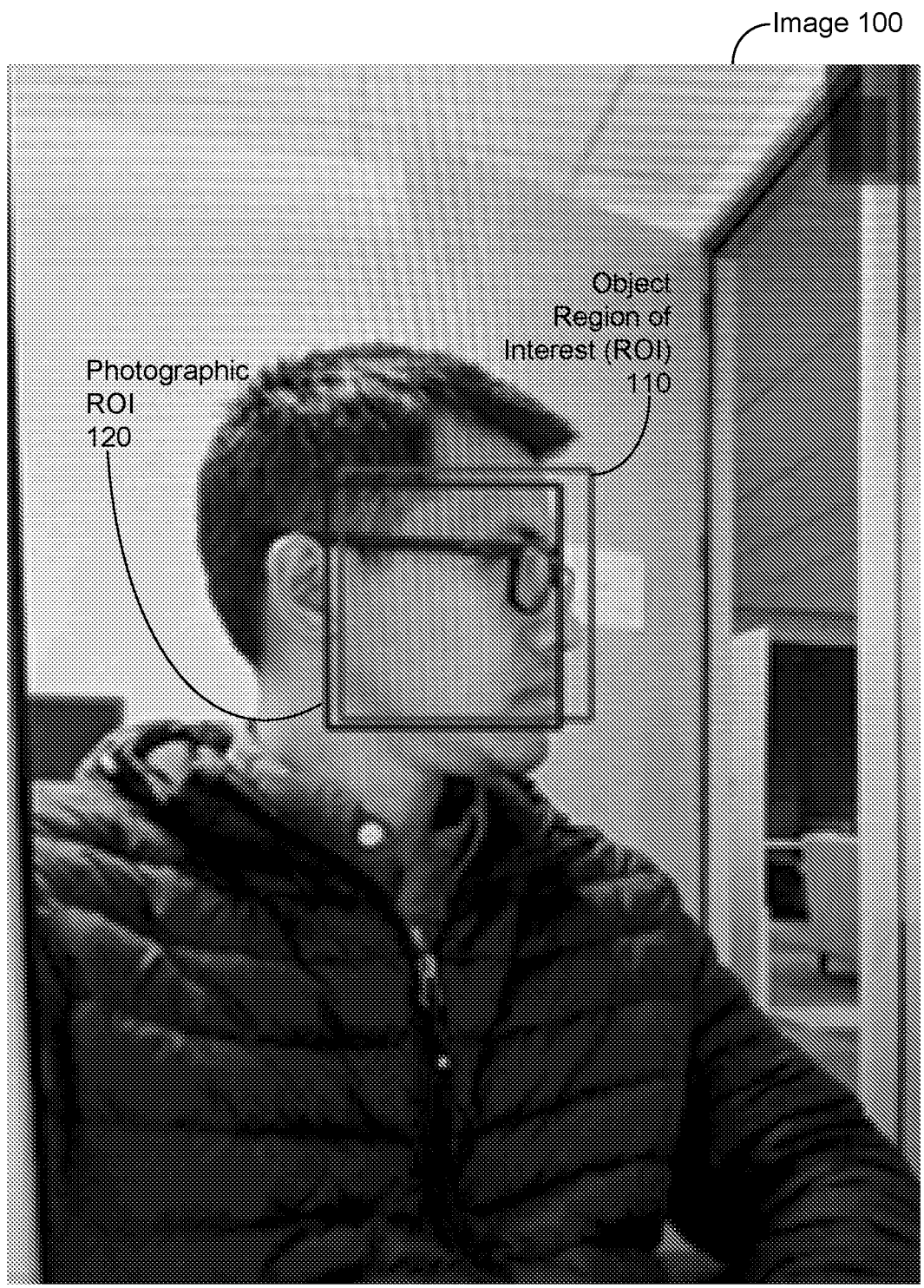
FIG. 1 shows an image with a photographic region of interest (ROI) and an object region of interest, in accordance with example embodiments.

Software and/or hardware object detectors can be used during photography. For example, an object detector can provide a region of interest (ROI) that includes and/or is otherwise associated with a detected object. An "object ROI" can be a region of interest that includes and/or is otherwise associated with a detected object. An ROI can be specified as a geometric shape (e.g., a rectangle, a square, a bounding box, a convex polygon, an ellipse) and/or as a mask of pixels (or similar data items) for an image. For example, an object ROI can be a rectangle produced by an object detector that bounds and/or includes a particular object; e.g. a human face.

After an object ROI is determined by the object detector, a photographic function can receive the object ROI as an input "photographic ROI" or region of interest provided to a photographic function. The output of the photographic function can be used by a camera to capture images; e.g., an image of the detected object. Such photographic functions, include, but are not limited to, an automatic exposure function, an automatic focus function, a face detection function, an automatic white balance function, and/or a local tone mapping function. For example, the automatic exposure function can be used to set an aperture of a lens of the camera, analog and/or digital gain of the camera, and/or a shutter speed of the camera prior to capturing an image; the automatic focus function can be used to adjust a position of the lens of the camera to ensure the object is in focus; the face detection function can locate one or more human faces within an image; and the automatic white balance function and/or the local tone mapping function can provide one or more outputs used to adjust colors captured by a camera to improve image quality.

When an object ROI is used as a photographic ROI, a different photographic ROI may be better than the object ROI for the photographic function. For example, an object detector can generate an object ROI that aligns with an area of an image that depicts a human face. However, using a different photographic ROI than the object ROI for the human face can yield better photographic quality. As an example, a photographic ROI for an automatic exposure function that identifies skin area with little or no coverage of other portions of the human face and/or other portions of the image may provide better photographic quality than an object ROI for the human face. That is, the automatic exposure function can perform better using a photographic ROI with maximum skin coverage of the human face and minimum coverage of other aspects of the image than when using an object ROI of the human face. As another example, a photographic ROI for an automatic focus function may be generally located in the same region as the object ROI for the human face, but this photographic ROI can be selected to maximize the number of edges for the human face, and to minimize background aspects of the image and so can differ from the object ROI. Other photographic ROIs and/or differences between photographic ROIs and object ROIs are possible as well.

Machine learning algorithms, such as but not limited to neural networks, can be trained and used to determine photographic ROIs. For example, a computing device can receive an input image and use an object detector to determine an object ROI for the input image; e.g., an object ROI for a human face depicted in the input image. Then, a trained machine learning algorithm can be used to identify one or more photographic ROIs that is/are suitable for use by one or more photographic functions to generate one or more additional images.

The machine learning algorithm can determine the photographic ROI(s) based on the input image and perhaps an object ROI detected in the input image. That is, in some examples, the machine learning algorithm can determine the photographic ROI(s) based on the input image and the object ROI, while in other examples, the machine learning algorithm can determine the photographic ROI(s) based on the input image without having the object ROI as an input.

The photographic ROI(s) determined by the machine learning algorithm can differ from the object ROI and can be photographic-function specific. For example, the machine learning algorithm can determine a first photographic ROI for a first photographic function (e.g., an automatic exposure function) and a second photographic ROI for a second photographic function (e.g., an automatic focus function), where the first photographic ROI differs from the second photographic ROI and/or both photographic ROIs can differ from the object ROI.

After training, a model or trained version of the machine learning algorithm can be provided to a computing device with a camera, such as a smartphone. Then, the trained machine learning algorithm can be invoked to predict and provide photographic ROIs to photographic functions. The photographic functions can use the photographic ROIs provided by the trained machine learning algorithm to better perform their functions; that is, to control focus, exposure, white balance, and/or other functionality of the camera that is used before, during, and/or after capturing images. As such, the herein-described techniques can utilize machine learning algorithms to determine better photographic ROIs, thereby enabling better performance of photographic functions when the photographic functions operate on other ROIs, such as object ROIs provided by object detectors. And, the better performance of photographic functions enables capturing of better images using the same camera hardware and software currently used to perform these photographic functions while capturing images. Thus, the herein-described techniques utilize machine learning algorithms to enable existing camera hardware and software to capture better images by providing better photographic ROIs to the camera.

Techniques and Apparatus for Generating Photographic Regions of Interest

FIG. 1 shows an image 100 with an object region of interest (ROI) 110 and a photographic ROI 120, in accordance with example embodiments. Both object ROI 110 and photographic ROI 120 are geometric shapes. However, as shown in FIG. 1, object ROI 110 covers a different portion of image 100 than photographic ROI 120, and so object ROI 110 differs from photographic ROI 120.

Object ROI 110 can be provided by an object detector, which can be software and perhaps hardware used to detect and identify imagery of one or more objects, such as, but not limited to, humans and/or human faces. Normally, an object detector will provide a geometrically shaped ROI or a mask of pixels, such as a segmentation result, that identifies one or more portions of an image that depict an object. In the specific case of object ROI 110, a face detector acting as an object detector generated the geometrically-shaped region of interest to identify the human face shown in a central portion of image 100 that is outlined by object ROI 110.

In the example shown in FIG. 1, the face detector determined object ROI 110 based on general visual criteria about how a region of interest should be generated to identify and align with a human face. However, to better performance of photographic functions, one or more different ROIs than object ROI 110 can be selected. For example, a photographic ROI for an automatic exposure photographic function can be a ROI closely identified with pixels of image 100 associated with skin color of a human face (and/or other depicted portion(s) of a person), with minimum coverage for the background, hair, glasses, and/or other non-skin objects.

Photographic ROI 120 is a region of interest selected for use by an automatic exposure and/or an automatic focus photographic function of a camera. As shown in FIG. 1, photographic ROI 120 is close to a face area identified by object ROI 110. However, photographic ROI 120 is more concentrated on edges of the human face shown in FIG. 1 and includes less background imagery than included in object ROI 110. As such, the automatic focus photographic function can perform better using photographic ROI 120 as in input than using object ROI 110 as an input. Additionally, photographic ROI 120 is more concentrated on skin-colored pixels of the human face shown in FIG. 1. As such, the automatic exposure function can perform better using photographic ROI 120 as in input than using object ROI 110 as an input. Other photographic ROIs are possible as well for image 100 and/or for other images as well.

Figure 2:
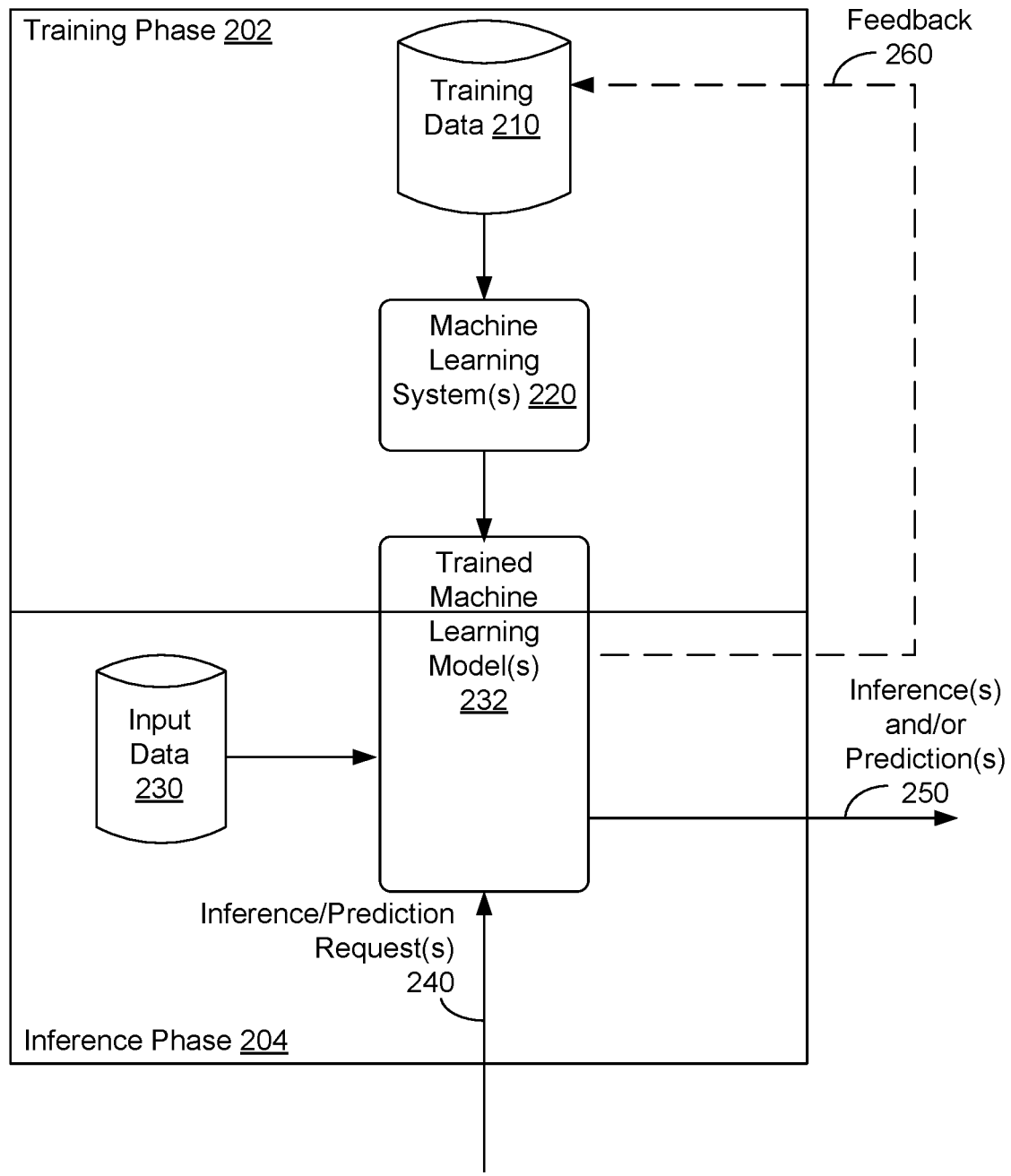
FIG. 2 is a diagram of a system with training and inference phases of one or more machine learning models, in accordance with example embodiments.

FIG. 2 is a diagram of system 200 with training phase 202 and inference phase 204 of one or more machine learning models 232, in accordance with example embodiments. Some machine learning techniques involve training one or more machine learning systems on an input set of training data to recognize patterns in the training data and provide output inferences and/or predictions about (patterns in the) training data. The resulting trained machine learning system can be called a trained machine learning model or machine learning model, for short. For example, FIG. 2 shows training phase 202 where one or more machine learning systems 220 are being trained on training data 210 to become one or more trained machine learning models 232. Then, during inference phase 204, trained machine learning model(s) 232 can receive input data 230 and one or more inference/prediction requests 240 (perhaps as part of input data 230) and responsively provide as an output one or more inferences and/or predictions 250.

Machine learning system(s) 220 may include, but are not limited to: an artificial neural network (e.g., a neural network configured to act as a feature extractor and/or as a rectangular regressor, a convolutional neural network, a recurrent neural network), a Bayesian network, a hidden Markov model, a Markov decision process, a logistic regression function, a support vector machine, a suitable statistical machine learning algorithm, and/or a heuristic machine learning system. During training phase 202, machine learning system(s) 220 can be trained by providing at least training data 210 as training input using training techniques, such as but not limited to, unsupervised, supervised, semi-supervised, confidence learning, reinforcement learning, transfer learning, incremental learning, and/or curriculum learning techniques.

Unsupervised learning involves providing a portion (or all) of training data 210 to machine learning system(s) 220. Then, machine learning system(s) 220 can determine one or more output inferences based on the provided portion (or all) of training data 210. Supervised learning can involve providing a portion of training data 210 to machine learning system(s) 220, with machine learning system(s) 220 determining one or more output inferences based on the provided portion of training data 210, and the output inference(s) are either accepted or corrected based on correct results associated with training data 210. In some examples, supervised learning of machine learning system(s) 220 can be governed by a set of rules and/or a set of labels for the training input, and the set of rules and/or set of labels may be used to correct inferences of machine learning system(s) 220.

Semi-supervised learning can involve having correct results for part, but not all, of training data 210. During semi-supervised learning, supervised learning is used for a portion of training data 210 having correct results, and unsupervised learning is used for a portion of training data 210 not having correct results. Confidence learning can involve training part or all of machine learning system(s) 220 to predict and/or otherwise determine confidence values representing how certain machine learning system(s) 220 are in a corresponding prediction (e.g., on a scale of 0%=totally uncertain to 100%=certain). In some examples, a prediction made during confidence learning can be combined with the confidence values to lead to a confidence-weighted prediction.

Reinforcement learning involves machine learning system(s) 220 can involve receiving a reward signal regarding a prior inference, where the reward signal can be a numerical value. During reinforcement learning, machine learning system(s) 220 can output an inference and receive a reward signal in response, where machine learning system(s) 220 are configured to try to maximize the numerical value of the reward signal. In some examples, reinforcement learning also utilizes a value function that provides a numerical value representing an expected total of the numerical values provided by the reward signal over time.

Transfer learning techniques can involve trained machine learning model(s) 232 being pre-trained on one set of data and additionally trained using training data 210. More particularly, machine learning system(s) 220 can be pre-trained on data from one or more computing devices and a resulting trained machine learning model provided to computing device CD1, where CD1 is intended to execute the trained machine learning model during inference phase 204. Then, during training phase 202, the pre-trained machine learning model can be additionally trained using training data 210, where training data 210 can be derived from kernel and non-kernel data of computing device CD1. This further training of the machine learning system(s) 220 and/or the pre-trained trained machine learning model using training data 210 of CD1's data can be performed using either supervised or unsupervised learning. Once machine learning system(s) 220 and/or the pre-trained machine learning model has been trained on at least training data 210, training phase 202 can be completed. The trained resulting machine learning model can be utilized as at least one of trained machine learning model(s) 232.

Incremental learning techniques can involve providing trained machine learning model(s) 232 (and perhaps machine learning system(s) 220) with input data that is used to continuously extend knowledge of trained machine learning model(s) 232. Curriculum learning techniques. can involve machine learning system(s) 220 with training data arranged in a particular order, such as providing relatively-easy training examples first and proceeding with progressively more difficult training examples e.g., analogously to a curriculum or course of study at a school. Other techniques for training machine learning system(s) 220 and/or trained machine learning model(s) 232 are possible as well.

In some examples, after training phase 202 has been completed but before inference phase 204 begins, trained machine learning model(s) 232 can be provided to a computing device CD1 where trained machine learning model(s) 232 are not already resident; e.g., after training phase 202 has been completed, trained machine learning model(s) 232 can be downloaded to computing device CD1.

For example, a computing device CD2 storing trained machine learning model(s) 232 can provide trained machine learning model(s) 232 to computing device CD1 by one or more of: communicating a copy of trained machine learning model(s) 232 to computing device CD1, making a copy of trained machine learning model(s) 232 for computing device CD1, providing access to trained machine learning model(s) 232 computing device CD1, and/or otherwise providing the trained machine learning system to computing device CD1. In some examples, trained machine learning model(s) 232 can be used by computing device CD1 immediately after being provided by computing device CD2. In some examples, after trained machine learning model(s) 232 are provided to computing device CD1, trained machine learning model(s) 232 can be installed and/or otherwise prepared for use before trained machine learning model(s) 232 can be used by computing device CD1.

During inference phase 204, trained machine learning model(s) 232 can receive input data 230 and generate and output corresponding inference(s) and/or prediction(s) 250 about input data 230. As such, input data 230 can be used as an input to trained machine learning model(s) 232 for providing corresponding inference(s) and/or prediction(s) 250 to kernel components and non-kernel components. For example, trained machine learning model(s) 232 can generate inference(s) and/or prediction(s) 250 in response to inference/prediction request(s) 240. In some examples, trained machine learning model(s) 232 can be executed by a portion of other software. For example, trained machine learning model(s) 232 can be executed by an inference or prediction daemon to be readily available to provide inferences and/or predictions upon request. Input data 230 can include data from computing device CD1 executing trained machine learning model(s) 232 and/or input data from one or more computing devices other than CD1.

In some examples, input data 230 can include a collection of images provided by one or more sources. The collection of images can include images of an object, such as a human face, where the images of the human face are taken under different lighting conditions, images of multiple objects, images resident on computing device CD1, and/or other images. Other types of input data are possible as well.

Inference(s) and/or prediction(s) 250 can include output images, depth maps, numerical values, and/or other output data produced by trained machine learning model(s) 232 operating on input data 230 (and training data 210). In some examples, trained machine learning model(s) 232 can use output inference(s) and/or prediction(s) 250 as input feedback 260. Trained machine learning model(s) 232 can also rely on past inferences as inputs for generating new inferences.

In some examples, machine learning system(s) 220 and/or trained machine learning model(s) 232 can be executed and/or accelerated using one or more computer processors and/or on-device coprocessors. The on-device coprocessor(s) can include, but are not limited to one or more graphic processing units (GPUs), one or more tensor processing units (TPUs), one or more digital signal processors (DSPs), and/or one or more application specific integrated circuits (ASICs). Such on-device coprocessors can speed up training of machine learning system(s) 220 and/or generation of inference(s and/or prediction(s) 250 by trained machine learning model(s) 232. In some examples, trained machine learning model(s) 232 can be trained, reside and execute to provide inference(s) and/or prediction(s) 250 on a particular computing device, and/or otherwise can make inferences for the particular computing device.

In some examples, one computing device CD_SOLO can include trained machine learning model(s) 232, perhaps after performing the training of machine learning system(s) 220 on computing device CD_SOLO. Then, computing device CD_SOLO can receive inference/prediction request(s) 240 to provide inference(s) and/or prediction(s) 250 and can use trained machine learning model(s) 232 operating on input data 230 to responsively provide inference(s) and/or prediction(s) 250, where inference(s) and/or prediction(s) 250 can be provided using a user interface and/or a display, as one or more electronic communications, as one or more printed documents, etc.

In some examples, two or more computing devices CD_CLI and CD_SRV can be used to provide inference(s) and/or prediction(s) 250. For example, a first computing device CD_CLI can generate and send inference/prediction request(s) 240 to a second computing device CD_SRV. Upon reception of inference/prediction request(s) 240 from CD_CLI, CD_SRV can use trained machine learning model(s) 232, perhaps after performing the training of machine learning system(s) 220, to operate on input data 230 and responsively determine inference(s) and/or prediction(s) 250. After determining inference(s) and/or prediction(s) 250, CD_SRV respond to the requests from CD_CLI by providing inference(s) and/or prediction(s) 250 to CD_CLI.

Figure 3:
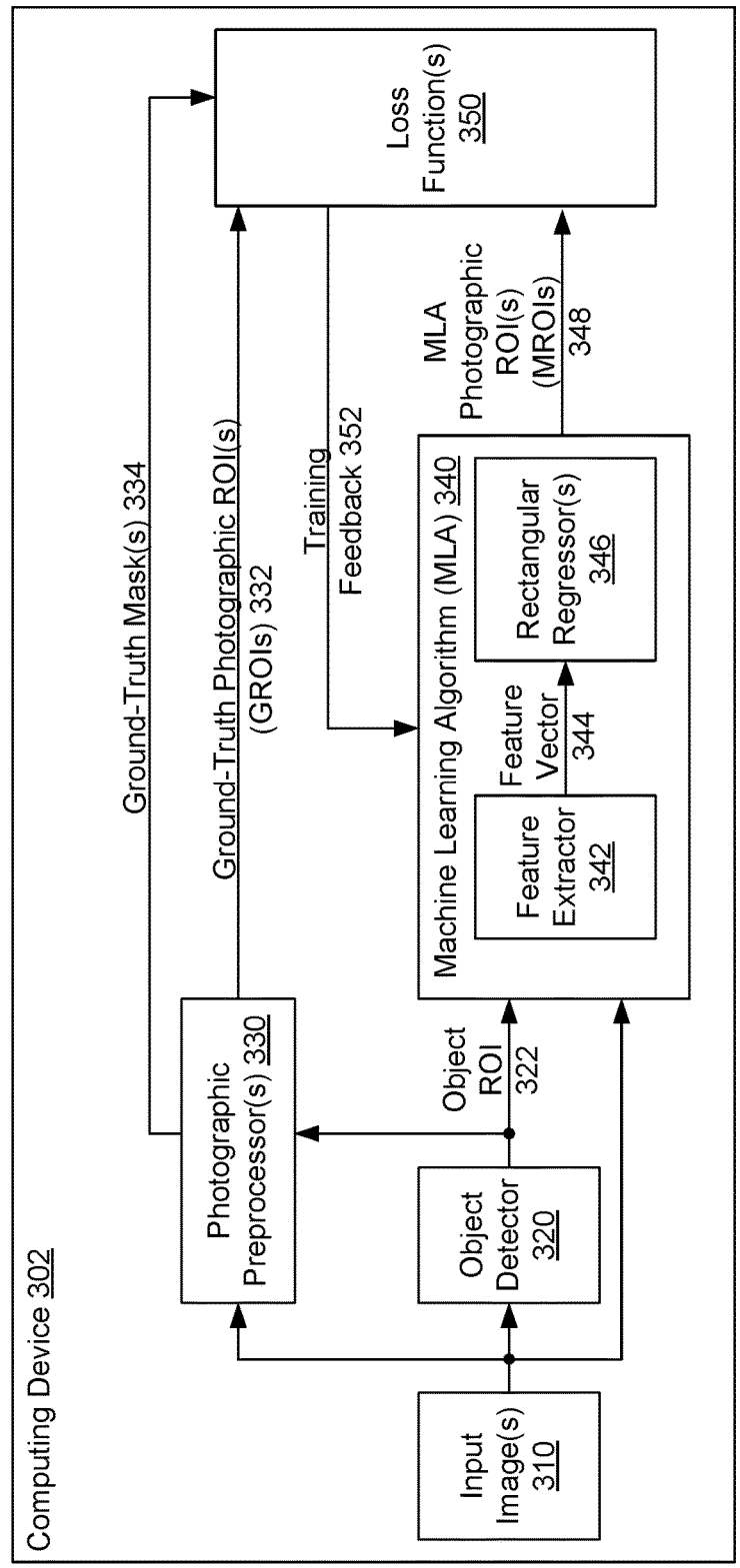
FIG. 3 is a diagram illustrating a system related to a training phase of a machine learning algorithm, in accordance with example embodiments.

FIG. 3 is a diagram illustrating system 300 related to a training phase of machine learning algorithm (MLA) 340, in accordance with example embodiments. The training phase of machine learning algorithm 340 can teach and/or train machine learning algorithm 340 to predict one or more machine learning algorithm photographic regions of interest (MROI(s)) 348. Method 500 for training machine learning algorithm 340 using system 300 is discussed below in more detail in the context of FIG. 5.

System 300 can include computing device 302. Computing device 302 can include one or more input images 310, object detector 320, one or more photographic preprocessors 330, machine learning algorithm 340, and one or more loss functions 350. While training machine learning algorithm 340, at least one of input image(s) 310 can be received by computing device 302 and subsequently provided to object detector 320, photographic preprocessor(s) 330, and machine learning algorithm 340.

In some examples, one or more computing devices can have software and/or hardware components configured to perform at least part of the herein-described functionality of computing device 302, which includes the herein-described functionality of object detector 320, photographic preprocessor(s) 330, machine learning algorithm 340, and loss function(s) 350. As such, the one or more computing devices of these examples can act as one or more of: object detector 320, photographic preprocessor(s) 330, machine learning algorithm 340, and loss function(s) 350.

Object detector 320 can identify whether input image(s) 310 include imagery for one or more objects; e.g., a human, a human face, an animal, a particular inanimate object, etc. In some examples, object detector 320 can identify one or more pre-determined objects; e.g., identify humans, identify human faces. In some examples, object detector 320 can identify an object that may be previously unknown to object detector 320, and so may not be a pre-determined object; e.g., object detector 320 can identify objects based on geometry, color patches, etc.

If object detector 320 determines that input image(s) 310 include imagery for one or more objects, object detector 320 can output an object ROI 322 for each identified object. Object ROI 322 can include a geometric shape that identifies and/or specifies a region of input image(s) 310 that depict one of the one or more objects. For example, object detector 320 can be a face detector configured to produce a rectangular ROI as object ROI 322 that locates a face in one of input images(s) 310.

In some examples, object ROI 322 can include a mask of pixels (or other values) that identifies and/or specifies one or more portions of input image(s) 310 that depict at least one of the one or more objects. As a more specific example, if input image(s) 310 include an image represented as a grid of R rows×C columns of pixels, then object ROI 322 can be a grid or other similar data structure having R rows and C columns of values (or perhaps a different sized grid) that indicate whether or not a pixel of input image(s) 310 depicts an object identified by object detector 320.

In some examples, object detector 320 can be a user interface or other interface that accepts inputs indicating one or more regions of interest in input image(s) 310. Then, object detector 320 can use the inputs indicating one or more regions of interest in input image(s) 310 to determine object ROI 322. As a more particular example, object detector 320 can be a user interface that accepts inputs that highlight, trace out, and/or otherwise specify an object of interest, such as a human face, in input image(s) 310 and can use those inputs specifying the object of interest in input image(s) 310 to determine object ROI 322. More specifically, the inputs specifying the object of interest in input image(s) 310 can include inputs of facial landmarks of a human face and object ROI 322 can be a bounding box or other geometric shape that includes and/or is otherwise based on the inputs of facial landmarks.

In some examples, object detector 320 can be used to generate photographic ROIs; that is, act to generate both object ROIs and to generate photographic ROIs. In such examples, object detector 320 is first trained to detect objects and perform the herein-described functionality of object detector 320. Then, a feature detector of trained object detector 320 can be used to obtain features from input image(s) 310 and to provide those features to train a rectangular regressor to predict photographic ROIs for a photographic function PF_COMB. During training of the rectangular regressor of object detector 320, a predicted ROI generated by the rectangular regressor of object detector 320 can be compared with one or more ground-truth photographic regions of interest (GROI(s)) 332 and perhaps one or more ground-truth masks 334 using loss function(s) 350 as described herein, and training feedback 352 can be provided to the rectangular regressor of object detector 320. Then, after the rectangular regressor of object detector 320 is trained, photographic ROIs for the photographic function PF_COMB can be obtained directly from object detector 320 using its rectangular regressor. In some of these examples, after the rectangular regressor of object detector 320 is trained, the trained rectangular regressor of object detector 320 can be moved from object detector 320 to be a rectangular regressor of rectangular regressor(s) 346. Other examples of object detector 320 and object ROI 322 are possible as well.

Photographic preprocessor(s) 330 can operate on input image(s) 310 and object ROI 322 to obtain ground-truth data associated with photographic ROIs. In some examples, there can be one photographic preprocessor of photographic preprocessor(s) 330 for each photographic function. Then, a photographic preprocessor that relates to a particular photographic function can obtain ground-truth data associated with a photographic ROI for the particular photographic function.

The ground-truth data associated with photographic ROIs can include, but is not limited to, input image(s) 310, object ROI 322, face rectangles, face landmarks, skin color type, etc. Photographic preprocessor(s) 330 can utilize manually-labeled and/or programmatically-generated input image(s) 310 and perhaps some additional data to the obtain ground-truth data. FIG. 3 shows the ground-truth data obtained by photographic preprocessor(s) 330 as GROI(s) 332 and ground-truth mask(s) 334. In some examples, object detector 320 does not generate object ROI 322; e.g., when a manually-labeled image includes information specifying object ROI 322.

Photographic preprocessor(s) 330 use one or more transformations to obtain the ground-truth data associated with photographic ROIs from input image(s) 310 and object ROI 322. For example, photographic preprocessor(s) 330 can include an automatic exposure preprocessor that can apply one or more transformations to input image(s) 310 and object ROI 322 that are related to maximizing skin-colored area coverage, skin color segmentation, glasses removal, and/or hair removal to generate one or more of GROI(s) 332 and/or ground-truth mask(s) 334 with additional information about skin-colored area coverage compared to object ROI 322. As another example, photographic preprocessor(s) 330 can include an automated focus preprocessor that can apply one or more transformations to input image(s) 310 and object ROI 322 related to depth values associated with one or more points on the object; e.g., one or more transformations that can maximize the number of edges for the human face and/or minimize background aspects of the image to generate one or more of GROI(s) 332 and/or ground-truth mask(s) 334 with additional depth-related information compared to object ROI 322. More, fewer, and/or different photographic preprocessor(s) 330 are possible as well.

Machine learning algorithm 340 can receive input image(s) 310 and object ROI 322 as inputs and responsively generate one or more machine learning algorithm photographic ROIs (MROIs) 348. Machine learning algorithm 340 can include feature extractor 342 and one or more rectangular regressors 346. Feature extractor 342 can include one or more convolutional neural networks, inception/MobileNet feature extractors, and/or other machine learning algorithms that can extract one or more discriminative features from an image of input image(s) 310 and/or from object ROI 322. The discriminative features can be numerical or other data that identify aspects of input image(s) 310 and/or from object ROI 322 that can be used in determining photographic ROIs. For example, at least one of the discriminative features provided by feature extractor 342 can separate facial and non-facial areas of an input image and/or a region of an input image specified by object ROI 322.

The extracted discriminative feature(s) can output from feature extractor 342 as feature vector 344 (or another data structure suitable for storing the discriminative features). Then, feature vector 344 can be input to rectangular regressor(s) 346 of machine learning algorithm 340. Each of rectangular regressor(s) 346 can include one or more convolutional neural networks and/or other machine learning algorithms that can generate one or more photographic ROIs for use by one or more corresponding photographic functions based on the features in feature vector 344. For example, the one or more photographic ROIs can include regions of interest usable by automatic focus, automatic exposure, automatic white balance and/or other photographic functions. The one or more photographic ROIs can be output from rectangular regressor(s) 346 as MROI(s) 348.

In some examples, there can be one rectangular regressor of rectangular regressor(s) 346 for each photographic function. Then, a rectangular regressor of rectangular regressor(s) 346 that relates to a particular photographic function can determine a photographic ROI for the particular photographic function.

Figure 4:
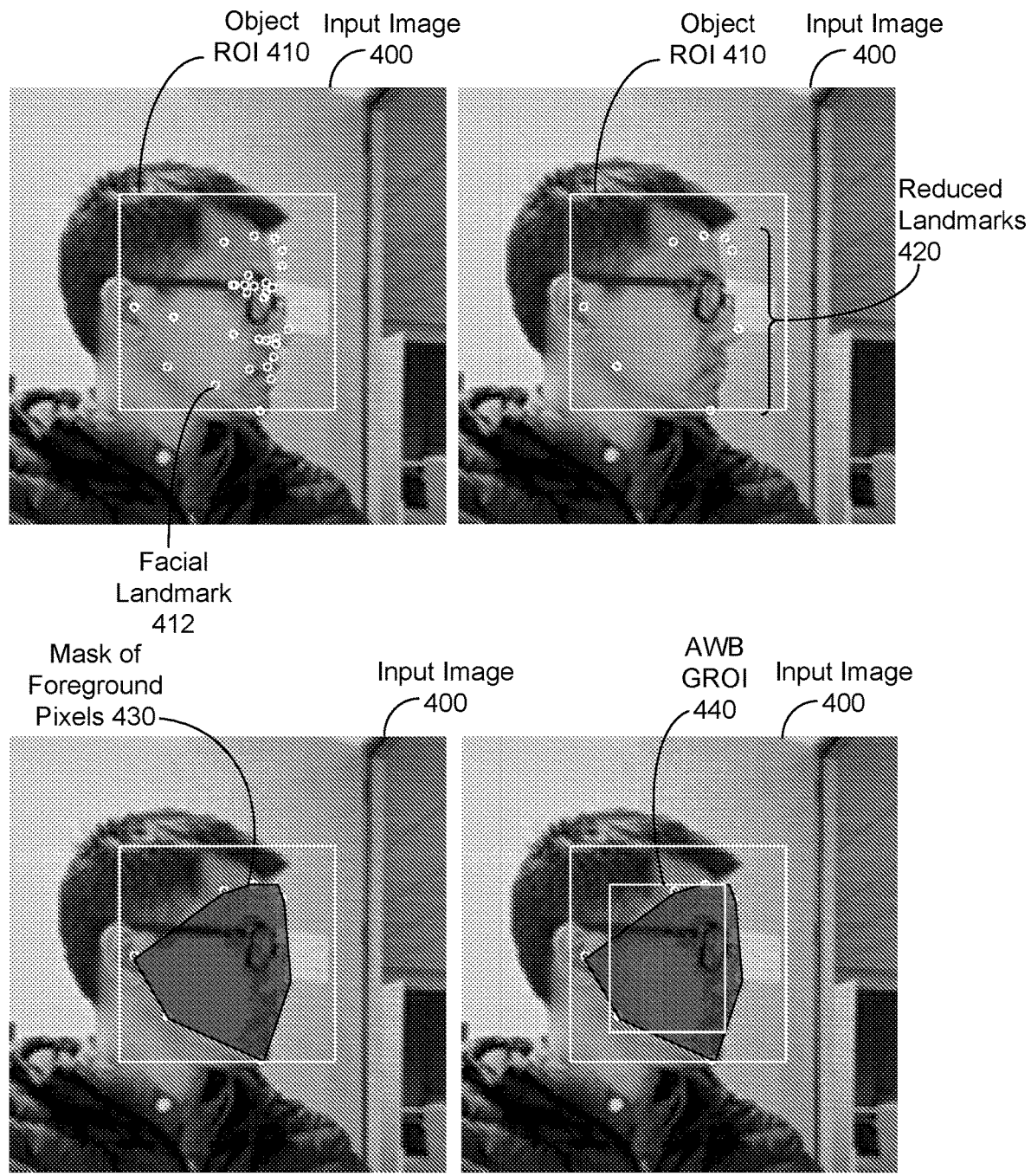
FIG. 4 illustrates an input image and a ground-truth region of interest, in accordance with example embodiments.

FIG. 4 illustrates input image 400 and an average white balance ground-truth region of interest (AWB GROI) 440, in accordance with example embodiments. Input image 400 can be provided to system 300 as part of input image(s) 310. As indicated at upper left of FIG. 4, upon reception of input image 400, object detector 320 can identify object ROI 410 associated with a face of a human depicted in input image 400 based on facial landmarks. At upper left of FIG. 4, input image 400 includes object ROI 410 shown using a while rectangle and facial landmarks, such as facial landmark 412, shown using white circles. In some examples, object detector 320 can identify facial landmarks, e.g., facial landmark 412, that indicate key locations about the face of the human, perhaps as part of identifying object ROI 410. In other examples, a user interface can be used to identify object ROI 410 and/or some or all of the facial landmarks depicted in input image 400; e.g., one or more persons can use the user interface to identify and indicate object ROI 410 and/or some or all of the facial landmarks.

At upper right of FIG. 4, an average white balance photographic preprocessor of photographic preprocessor(s) 330 can be used to determine a reduced set of the facial landmarks shown at upper left of FIG. 4—the resulting reduced set of the facial landmarks is shown at upper right of FIG. 4 as reduced landmarks 420. In this example, reduced landmarks 420 form a convex hull of the facial landmarks detected in image 420.

At lower left of FIG. 4, the average white balance photographic preprocessor can determine mask of foreground pixels 430 as a set of pixels that lie within and perhaps on the convex hull of the facial landmarks. In FIG. 4, mask of foreground pixels 430 is illustrated in relatively-dark grey. After mask of foreground pixels 430 is determined, the average white balance photographic preprocessor can provide mask of foreground pixels 430 to loss function(s) 350 as part of ground-truth mask(s) 334.

At lower right of FIG. 4, the average white balance photographic preprocessor can search over all possible rectangles to find a rectangle illustrated as AWB GROI 440 that has a highest ratio between an intersection of mask of foreground pixels 430 and an rectangle within input image 400 to a union of the of mask of foreground pixels 430 and the rectangle within input image 400. Searching over a number of possible ROIs to maximize a function value (e.g., the ratio between the union and the intersection mentioned above) is discussed below in more detail at least in the context of argmax_roi( ) function. After AWB GROI 440 is determined, the average white balance photographic preprocessor can provide AWB GROI 440 to loss function(s) 350 as part of GROI(s) 332.

Returning to FIG. 3, loss function(s) 350 can include one or more loss functions that can calculate one or more loss values. For example, a loss value can be determined between a ground-truth photographic ROI of GROI(s) 332 and a machine learning algorithm ROI of MROI(s) 348. The loss value(s) can be provided by loss function(s) 350 as part or all of training feedback 352 to teach, train, and/or improve machine learning algorithm.

In some examples, there can be one loss function of loss function(s) 350 for each photographic function. Then, a loss function of loss function(s) 350 that relates to a particular photographic function can determine a loss value and/or other data as part of training feedback 352 that can be used to train machine learning algorithm 340 to determine a photographic ROI for the particular photographic function.

In some examples, system 300 can perform processing that includes using a photographic preprocessor of photographic preprocessor(s) 330 to calculate a ground-truth mask and to search for a ground-truth photographic ROI of GROI(s) 332 using a ground-truth mask such as discussed herein at least in the context of FIG. 4 Then, loss function(s) 350 can determine loss values using the ground-truth photographic ROI without using a ground-truth mask In some of these examples, loss function(s) 350 do not receive any of ground-truth mask(s) 334 as the only inputs.

In some examples, system 300 can perform processing that includes using a photographic preprocessor of photographic preprocessor(s) 330 to search for a ground-truth photographic ROI of GROI(s) 332 without using a ground-truth mask. Then, loss function(s) 350 do not receive any of ground-truth mask(s) 334 as inputs and so determine loss values using GROI(s) 332 as the only inputs.

In some examples, system 300 can perform processing that includes using a photographic preprocessor of photographic preprocessor(s) 330 to search for a ground-truth photographic ROI of GROI(s) 332 and then to use the ground-truth photographic ROI to determine a ground-truth mask of ground-truth mask(s) 334. Then, loss function(s) 350 can determine loss values using GROI(s) 332 and ground-truth mask(s) 334 as inputs.

As an example, a technique to obtain to train machine learning algorithm 340 to determine a photographic ROI for an automatic exposure photographic function can include:

- Object detector 320 can receive an input image I1 from computing device 302 and can determine a face mask F1 for an input image I1 of input image(s) 310 using face segmentation.
- An automatic photographic preprocessor for an automatic exposure photographic function AEPP of photographic preprocessor(s) 330 can use a skin color detector to retain only the skin-colored pixels of F1 to obtain improved mask F2 as one of ground-truth mask(s) 334. Then, AEPP can iterate over mask F2 to find a ground-truth geometrically-shaped photographic ROI GT_ROI_AE for the automatic exposure photographic function.
- To determine GT_ROI_AE, AEPP can iterate over mask F2 using Equation (1):

$$\text{GT\_ROI\_AutoExp} = \text{argmax\_roi}\left(\frac{\bigcap(\text{GT\_ROI\_AutoExp}, F2)}{\bigcup(\text{GT\_ROI\_AutoExp}, F2)}\right) \quad (1)$$

where ∩(A, B) takes the intersection of each (pixel) value in A and in B,
where ∪(A, B) takes the union of each (pixel) value in A and B, and
where argmax_roi(f(ROI, mask)) can iterate over a number of ROIs to maximize a function value f(ROI, mask).

In some examples, argmax_roi( ) can iterate over all possible geometrically-shaped ROIs associated with at least a portion of an input image e.g., all possible geometrically-shaped ROIs that lie in input image I1; all possible geometrically-shaped ROIs that include at least a portion of mask F2. In some examples, argmax_roi( ) can iterate over a subset of all possible geometrically-shaped ROIs associated with at least a portion of image I1; e.g., argmax_roi( ) can iterate over only square and/or rectangular shaped ROIs, searches over only circular and/or elliptical shaped ROIs.

In this specific example, f(ROI, mask)=∩(GT_ROI_AE, F2)/∪(GT_ROI_AE, F2) and argmax_roi( ) iterates over each possible rectangular and/or square shaped ROI GT_ROI_AE that lies in mask F2 to maximize ∩(GT_ROI_AE, F2)/∪(GT_ROI_AE, F2). Then, AEPP can provide GT_ROI_AE to loss function(s) 350 as one of GROI(s) 332.

Use machine learning algorithm 340 to determine a predicted photographic ROI Pred_ROI_AE for the automatic exposure. photographic function for image I1. In some examples, the machine learning algorithm can receive image I1 as an input and generate Pred_ROI_AE as an output. In other examples, the machine learning algorithm can receive image I1 and an object ROI (such as face mask F1) as inputs and generate Pred_ROI_AE as an output. Pred_ROI_AE can be provided to loss function(s) 350 as one of MROI(s) 348.

Then, loss function(s) 350 can use Equation (2) below as a loss function to determine a loss value Loss AE for evaluating the predicted photographic ROI Pred_ROI_AE with respect to the ground truth photographic ROI GT_ROI_AE for the automatic exposure photographic function:

$$\text{Loss\_AE} = \left| \frac{\left|\bigcap(\text{Pred\_ROI\_AE, GT\_ROI\_AE})\right|}{\left|\bigcup(\text{Pred\_ROI\_AE, GT\_ROI\_AE})\right|} \right| \quad (2)$$

In other examples, a loss function can differ from Equation (2); e.g., a loss function can utilize a 2-norm or other norm of the ratio shown in Equation (2) rather than utilizing an absolute value. Other loss functions for evaluating the predicted photographic ROIs for automatic exposure photographic functions are possible as well.

Then, loss function(s) 350 can provide Loss AE as a loss value as part of training feedback 352. Training feedback 352 can be used to train machine learning algorithm 340 to predict a photographic ROI for the automatic exposure .photographic function.

As another example, a technique to obtain to train machine learning algorithm 340 to determine a photographic ROI for an automatic focus photographic function can include:

Object detector 320 can receive an input image I1 from computing device 302 and can determine a face mask F1 for an input image I1 of input image(s) 310 using face segmentation.

An automatic photographic preprocessor for an automatic focus photographic function AFPP of photographic preprocessor(s) 330 can compute depth values of face mask F1 to determine depth map DM1. Then, AFPP can iterate over depth map DM1 to find a ground-truth geometrically-shaped photographic ROI GT_ROI_AF for the automatic focus photographic function.

To determine GT_ROI_AF, AFPP can iterate over depth map DM1 using Equation (3):

$$\text{GT\_ROI\_AF} = \text{argmax\_roi}\left(\frac{\left|\bigcap(\text{GT\_ROI\_AF}, DM1)\right|}{\left|\bigcup(\text{GT\_ROI\_AF}, DM1)\right|}\right) \quad (3)$$

argmax_roi(f(ROI, mask)) can iterate over a number of ROIs to maximize a function value f(ROI, mask). In this specific example, argmax_roi( ) iterates over each possible rectangular and/or square shaped ROI GT_ROI_AF that lies in depth map DM1 to maximize ∩(GT_ROI_AF, DM1)/∪(GT_ROI_AF, DM1). Then, AFPP can provide GT_ROI_AF to loss function(s) 350 as one of GROI(s) 332.

Use machine learning algorithm 340 to determine a predicted photographic ROI Pred_ROI_AF for image I1. In some examples, the machine learning algorithm can receive image I1 as an input and generate Pred_ROI_AF as an output. In other examples, the machine learning algorithm can receive image I1 and an object ROI such as face mask F1 as inputs and generate Pred_ROI_AF as an output. Then, Pred_ROI_AF can be provided to loss function(s) 350 as one of MROI(s) 348.

Then, loss function(s) 350 can use Equation (4) below as a loss function to determine a loss value Loss AF for evaluating the predicted photographic ROI Pred_ROI_AF with respect to the ground truth photographic ROI GT_ROI_AF for the automatic focus photographic function.

$$\text{Loss\_AF} = \left| \frac{\left|\bigcap(\text{Pred\_ROI\_AF, GT\_ROI\_AF})\right|}{\left|\bigcup(\text{Pred\_ROI\_AF, GT\_ROI\_AF})\right|} \right| \quad (4)$$

In other examples, the loss function can differ from Equation (4); e.g., a 2-norm of the ratio shown in Equation (4) can be utilized rather than an absolute value. Still other loss functions for evaluating the predicted photographic ROIs for automatic focus photographic functions are possible as well.

Then, loss function(s) 350 can provide Loss AF as a loss value as part of training feedback 352, where training feedback 352 can be used to train machine learning algorithm 340 to predict a photographic ROI for the automatic exposure .photographic function.

As another example, a technique to obtain to train machine learning algorithm 340 to determine a photographic ROI for an automatic white balance photographic function can include:

Object detector 320 can receive an input image I1 from computing device 302 and can determine a face mask F1 for an input image I1 of input image(s) 310 using face segmentation.

An automatic photographic preprocessor for an automatic white balance photographic function AWBPP of photographic preprocessor(s) 330 can iterate over face mask F1 to find a ground-truth geometrically-shaped photographic ROI GT_ROI_AWB for the automatic white balance function photographic function.

To determine GT_ROI_AWB, AWBPP can iterate over face mask F1 using Equation (5):

$$\text{GT\_ROI\_AWB} = \text{argmax\_roi}\left(\frac{\left|\bigcap(\text{GT\_ROI\_AWB}, F1)\right|}{\left|\bigcup(\text{GT\_ROI\_AWB}, F1)\right|}\right) \quad (5)$$

argmax_roi(f(ROI, mask)) can iterate over a number of ROIs to maximize a function value f(ROI, mask). In this specific example, argmax_roi( ) iterates over each possible rectangular and/or square shaped ROI GT_ROI_AWB that lies in face mask F1 to maximize ∩(GT_ROI_AWB, F1)/∪(GT_ROI_AWB, F1. Then, AWBPP can provide GT_ROI_AWB to loss function(s) 350 as one of GROI(s) 332.

Use machine learning algorithm 340 to determine a predicted photographic ROI Pred_ROI_AWB for the automatic white balance photographic function for image I1. In some examples, the machine learning algorithm can receive image I1 as an input and generate Pred_ROI_AWB as an output. In other examples, the machine learning algorithm can receive image I1 and an object ROI such as face mask F1 as inputs and generate Pred_ROI_AWB as an output. Then, Pred_ROI_AWB can be provided to loss function(s) 350 as one of MROI(s) 348.

Then, loss function(s) 350 can use Equation (6) below as a loss function to determine a loss value Loss_AWB for evaluating the predicted photographic ROI Pred_ROI_AWB with respect to the ground truth photographic ROI GT_ROI_AWB for the automatic white balance photographic function:

$$\text{Loss\_AWB} = \left| \frac{\bigcap (\text{Pred\_ROI\_AWB, GT\_ROI\_AWB})}{\bigcup (\text{Pred\_ROI\_AWB, GT\_ROI\_AWB})} \right| \quad (6)$$

In other examples, the loss function can differ from Equation (6); e.g., a 2-norm of the ratio shown in Equation (6) can be utilized rather than an absolute value. Other loss functions for evaluating the predicted photographic ROIs for automatic white balance photographic functions are possible as well.

Then, loss function(s) 350 can provide Loss_AWB as a loss value as part of training feedback 352, where training feedback 352 can be used to train machine learning algorithm 340 to predict a photographic ROI for the automatic white balance photographic function.

Figure 5:
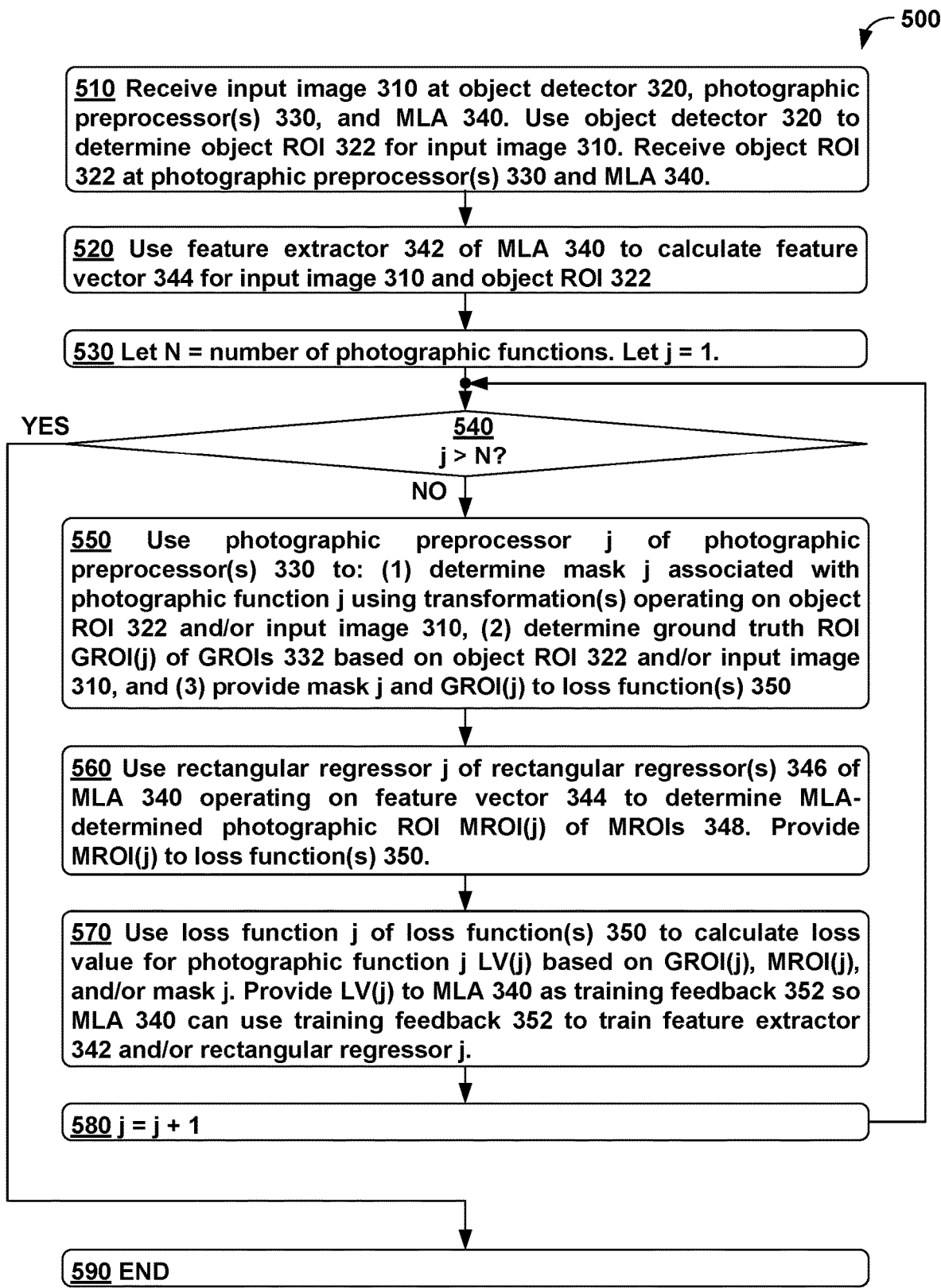
FIG. 5 is a flowchart of another method, in accordance with example embodiments.

FIG. 5 is a flowchart of a method 500, in accordance with example embodiments. Method 500 can be used to train a machine learning algorithm to generate photographic ROIs for one or more photographic functions; for example, machine learning algorithm 340. Method 500 can be carried out by a computing device; e.g., one or more of computing device 302, computing device 602, computing device 1100, and/or network 1006 of computing clusters discussed below in the context of FIG. 12.

The computing device carrying out method 500 can include software and/or hardware components configured to perform at least the herein-described functionality of object detector 320, photographic preprocessor(s) 330, machine learning algorithm 340, and loss function(s) 350. As such, the computing device carrying out method 500 can perform the herein-described functionality of object detector 320, photographic preprocessor(s) 330, machine learning algorithm 340, and loss function(s) 350.

Method 500 can begin at block 510, where the computing device can receive an input image as input image 310 and provide input image 310 to object detector 320, photographic preprocessor(s) 330, and machine learning algorithm 340 of the computing device. Then, object detector 320 can determine object ROI 322 for input image 310 and can provide object ROI 322 to photographic preprocessor(s) 330 of the computing device and machine learning algorithm 340 of the computing device.

At block 520, feature extractor 342 of machine learning algorithm 340 of the computing device can calculate feature vector 344 for input image 310 and object ROI 322. That is, one feature vector—feature vector 344—can be calculated for use by all of the photographic functions. Calculation and communication of one feature vector can enable all photographic functions to have access to all features, thereby allowing for feature reuse between photographic functions and for efficient feature determination and communication.

At block 530, the computing device can let an integer value N, N>0, be equal to a number of photographic functions that have photographic ROIs, where the photographic ROIs will be calculated by machine learning algorithm 340 during training. Also, the computing device can let an integer value j be equal to 1.

At block 540, the computing device can determine whether j is greater than N. If j is greater than N, the computing device can proceed to block 590. Otherwise, j is less than or equal to N, and the computing device can proceed to block 550.

At block 550, the computing device can use photographic preprocessor j of photographic preprocessor(s) 330 to: determine a mask j associated with photographic function j using one or more transformations operating on object ROI 322 and/or input image 310, and determine a ground-truth photographic ROI GROI(j) of GROI(s) 332 based on object ROI 322 and/or input image 310. For example, photographic preprocessor j can exhaustively search object ROI 322 for photographic function j using the argmax_roi function as discussed above at least in the context of FIG. 3 and/or using other searching functionality. Then, photographic preprocessor j of photographic preprocessor(s) 330 can provide mask j and GROI(j) to loss function(s) 350.

At block 560, the computing device can use rectangular regressor j of rectangular regressor(s) 346 of machine learning algorithm 340 operating on feature vector 344 to determine MLA-photographic ROI MROI(j) of MROI(s) 348. Then, rectangular regressor j can provide MROI(j) to loss function(s) 350.

At block 570, the computing device can use loss function j of loss function(s) 350 to calculate a loss value LV(j) for photographic function j, where loss value LV(j) can be determined based on GROI(j), MROI(j), and/or mask j. For example, loss value LV(j) can be calculated as LV(j)=|A−B|, where A=intersection(GROI(j), mask j)/union(GROI(j), mask j), and B=intersection(MROI(j), mask j)/union(MROI(j), mask j), such as discussed above in the context of at least Equations (2), (4) and (6) above.

After calculating loss value LV(j), loss function j can provide loss value LV(j) to machine learning algorithm 340 as (part of) training feedback 352. Then, machine learning algorithm 340 can use training feedback 352 to train feature extractor 342 and/or rectangular regressor j of rectangular regressor(s) 346.

At block 580, the computing device can increment j; that is, set j equal to j+1. After incrementing j, the computing device can proceed to block 540.

At block 590, the computing device can end method 500. In a related method, at block 590 the computing device can await another input image 310 and, upon reception of another input image 310, proceed to block 510 and re-execute method 500. Other related methods to method 500 are possible as well.

Method 500 can be configured with privacy controls to ensure privacy of one or more persons whose faces are present in the images processed by method 500. For example, the computing device can obtain explicit permission from each person whose face is represented by in an input image of input image(s) 310 before proceeding with the remainder of method 500.

In other examples, the one or more persons whose faces are in an input image of input image(s) 310 can give prior approval to perform method 500 before input image(s) 310 is/are received at block 510, and the computing device can verify that approval as needed before performing the remainder of method 500. In still other examples, such permissions may be implicit; e.g., if the owner of a device that captures an input image captures only their own face in a "selfie" image and uses method 500 to train a machine learning algorithm with the selfie as part of input image(s) 310, the owner's permission to proceed to perform method 500 for their own face may be inferred by providing the selfie as part of input image(s) 310. Combinations of these privacy-related techniques and/or other techniques for ensuring privacy of persons whose faces are captured in input image(s) 310 and/or other images are possible as well.

Figure 6:
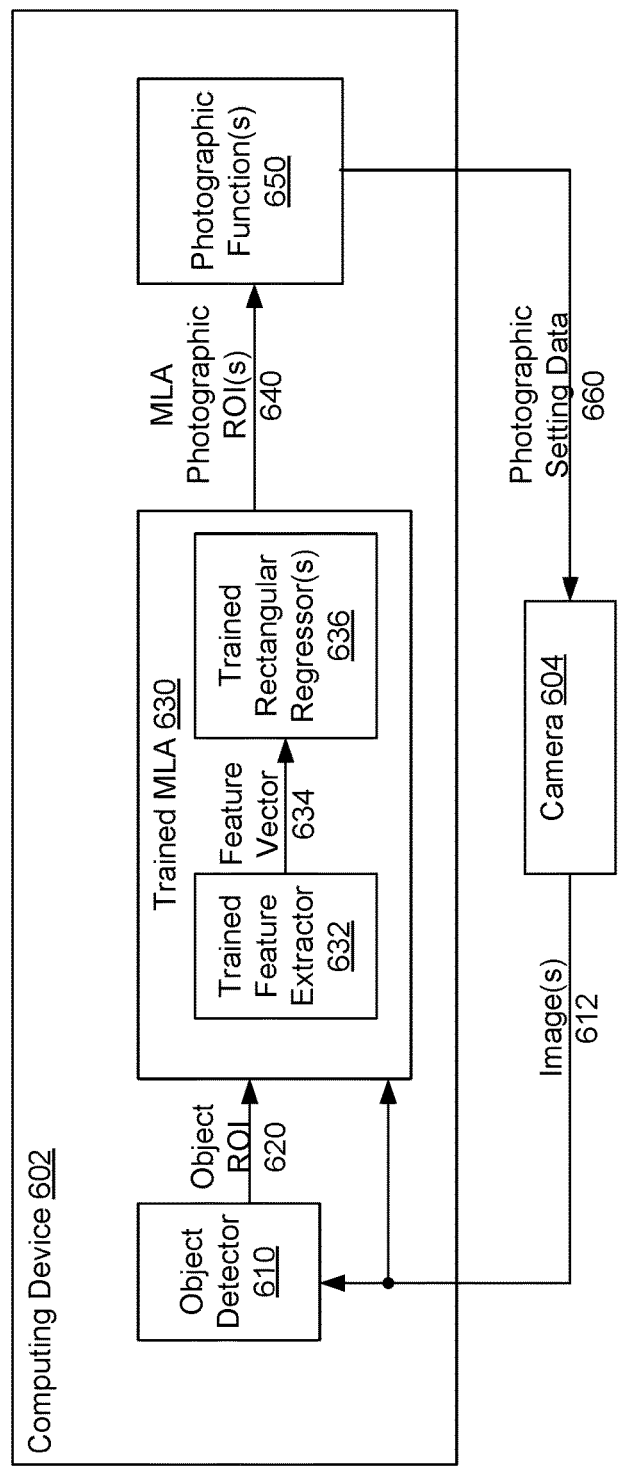
FIG. 6 is a diagram illustrating a system related to an inference phase of a trained machine learning algorithm, in accordance with example embodiments.

FIG. 6 is a diagram illustrating system 600 related to an inference phase of a trained machine learning algorithm 630, in accordance with example embodiments. System 600 includes computing device 602 and camera 604. FIG. 6 shows that computing device 602 with software and/or hardware components that include object detector 610, trained machine learning algorithm 630, and one or more photographic functions 650. Camera 604 can include one or more lenses, lens motors, light sensors, hardware processors, and/or software for utilizing hardware of camera 604 and/or for communicating with computing device 602.

In some examples, computing device 602 and camera 604 are components of one device; e.g., a smartphone, a computer-operated camera, a laptop computer and can share hardware and/or software resources; one or more photographic functions 650. In some examples, computing device 602 includes specific software, such as driver software, to communicate with camera 604. In some examples, computing device 602 and camera 604 are separate, communicatively-coupled components—in specific examples, each of computing device 602 and camera 604 have separate hardware and software resources. For example, camera 604 can include one or more lenses, lens motors, light sensors, hardware processors, and software for utilizing hardware of camera 604 and/or for communicating with computing device 602. In some examples, some or all of object detector 610, trained machine learning algorithm 630, and one or more photographic functions 650 are part of camera 604. In some examples, computing device 602 and/or camera 604 includes software that processes raw image data captured by camera 604 to generate corresponding viewable images; e.g., one or more images of image(s) 612.

Object detector 610 can identify whether an input image, such an image of one or more images 612, includes imagery for one or more objects. If object detector 610 determines that an input image include imagery for one or more objects, object detector 610 can output an object ROI 620 for each identified object. For example, object detector 610 can perform the functionality described above in the context of object detector 320, except that object detector 320 operates as part of system 300 and object detector 610 operates as part of system 600. Then, object ROI 620 can have some or all of the characteristics of object ROI 322 described above in the context of system 300 of at least FIG. 3; e.g., object ROI 620 can include geometric shape and/or a mask of pixels that identifies and/or specifies one or more portions of an input image that depict one of the one or more objects.

Trained machine learning algorithm 630 can receive an input image, such an image of image(s) 612, and an object ROI, such as object ROI 620, as inputs and responsively one or more machine learning algorithm photographic ROIs 640. Machine learning algorithm 630 can include trained feature extractor 632 and one or more trained rectangular regressors 636. For example, trained machine learning algorithm 630 can be a trained version of machine learning algorithm 340 described above in the context of system 300 and at least FIG. 3, trained feature extractor 632 can be a trained version of feature extractor 342 described above in the context of system 300 and at least FIG. 3, and trained rectangular regressor(s) 636 can be trained versions of rectangular regressor(s) 346 described above in the context of system 300 and at least FIG. 3.

Further, trained feature extractor 632 can receive the input image and object ROI 620 as inputs, extract one or more discriminative features from the input image and object ROI 620, and output the discriminative feature(s) as feature vector 634 as described above in the context of system 300 and at least FIG. 3. Then, feature vector 634 can be input to trained rectangular regressor(s) 636 generate one or more machine learning algorithm photographic ROIs 640 for use by one or more corresponding photographic functions (e.g., photographic function(s) 650) as described above in the context of system 300 and at least FIG. 3.

In some examples, there can be one rectangular regressor of trained rectangular regressor(s) 636 for each photographic function of photographic function(s) 650. Then, a trained rectangular regressor of trained rectangular regressor(s) 636 that relates to a particular photographic function of photographic function(s) 650 can determine a photographic ROI for the particular photographic function of photographic function(s) 650.

Photographic function(s) 650 can provide photographic setting data 660 that can be used to control, improve, and/or direct one or more operations of camera 604. For example, photographic function(s) 650 can include one or more of: an automatic exposure function, an automatic focus function, an automatic white balance function, and/or a local tone mapping function.

For example, an automatic exposure function of photographic function(s) 650 can receive an AE photographic ROI of machine learning algorithm photographic ROIs 640 as an input, where the AE photographic ROI is predicted by trained machine learning algorithm for use by the automatic exposure function. Then, the automatic exposure function can use AE photographic ROI to generate automatic exposure data, which can include an automatic exposure data/ dynamic range histogram. The automatic exposure data can be provided by the automatic exposure function as part of photographic setting data 660 for use by camera 604; e.g., in capturing image(s) 612. For example, the automatic exposure data/dynamic range histogram can be used by camera 604 to adjust how much light reaches one or more light sensors of camera 604; i.e., adjust the exposure of camera 604.

As another example, an automatic white balance function, and/or a local tone mapping function of photographic function(s) 650 can receive an AWB photographic ROI of machine learning algorithm photographic ROIs 640 as an input, where the AWB photographic ROI is predicted by trained machine learning algorithm for use by the automatic white balance function and/or the local tone mapping function Then, the automatic white balance function and/or the local tone mapping function can use AWB photographic ROI to generate AWB data, such as a color scale vector and/or color correction matrix. The AWB data can be provided by the automatic white balance function and/or the local tone mapping function as part of photographic setting data 660 for use by camera 604; e.g., in capturing image(s) 612. For example, camera 604 can use the AWB data to change, balance, and/or adjust colors as received by one or more light sensors of camera 604.

As another example, an automatic focus function of photographic function(s) 650 can receive an AF photographic ROI of machine learning algorithm photographic ROIs 640 as an input, where the AF photographic ROI is predicted by trained machine learning algorithm for use by the automatic focus function. Then, the automatic focus function can use AF photographic ROI to generate automatic focus data, which can one or more auto-focus commands to one or more lens motors of camera 604 to adjust focal length of one or more lenses of camera 604, thereby adjusting focus of camera 604. The automatic focus data can be provided by the automatic focus function as part of photographic setting data 660 for use by camera 604; e.g., in capturing image(s) 612. For example, camera 604 can execute the one or more auto-focus commands received in photographic setting data 660 to adjust focus of camera 604. Other examples of photographic function(s) 650 and/or photographic setting data 660 are possible as well.

FIG. 6 shows that image(s) 612 are provided by camera 604 to computing device 602 for generation of photographic setting data as discussed above. In some examples, image(s) 612 can be utilized for other purposes than the generation of photographic setting data as discussed above; e.g., image(s) 612 can be displayed, communicated to another device than camera 604, printed, etc.

Figure 7:
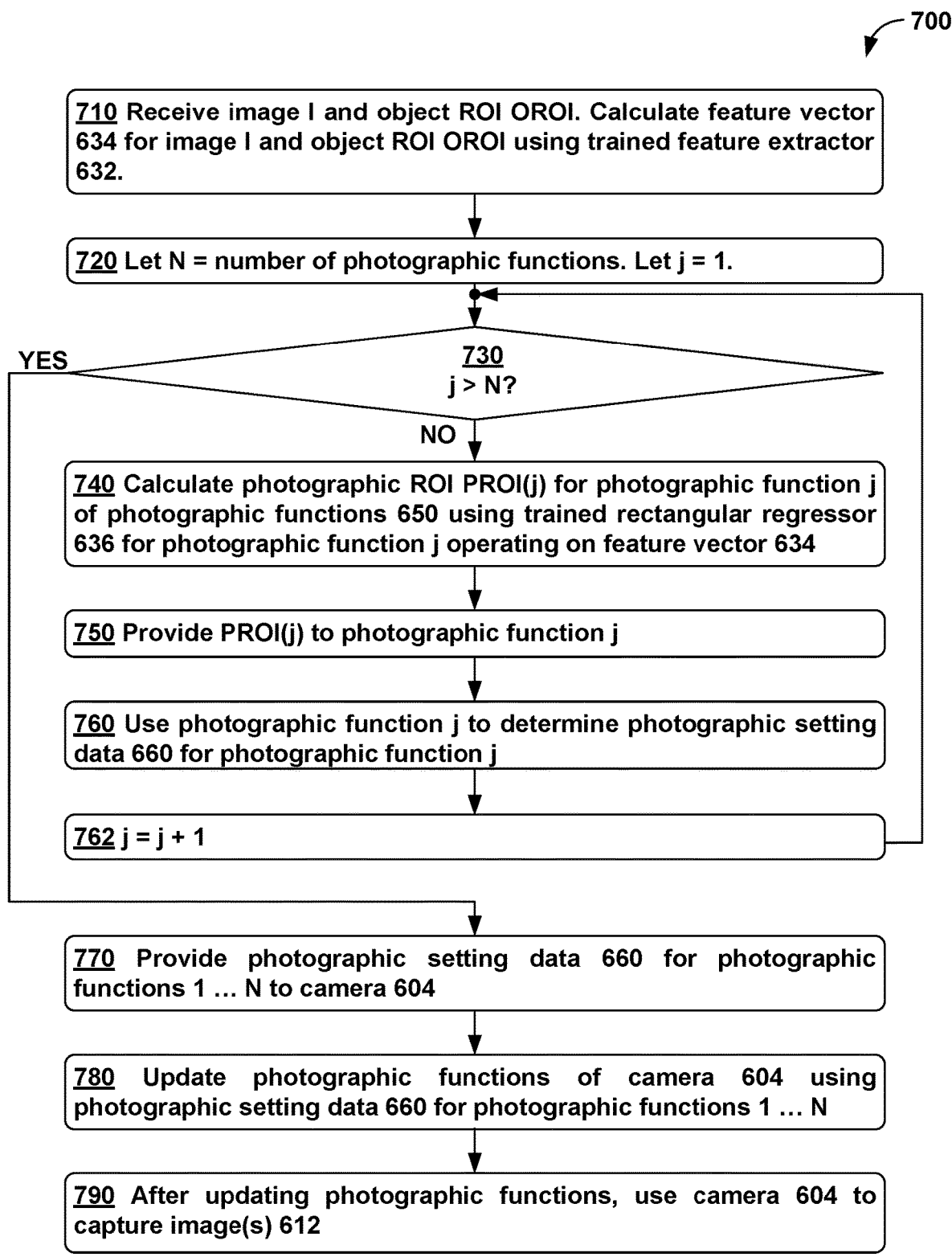
FIG. 7 is a flowchart of another method, in accordance with example embodiments.

FIG. 7 is a flowchart of method 700, in accordance with example embodiments. Method 700 can involve using a trained machine learning algorithm of a computing device for generating photographic ROIs for one or more photographic functions, using the photographic function(s) to determine photographic setting data based on the photographic ROIs, providing the photographic setting data to a camera, and using the camera to capture images using the photographic setting data.

As such, at least part of method 700 can be carried out by a computing device; e.g., one or more of computing device 302, computing device 602, computing device 1100, and/or network 1006 of computing clusters discussed below in the context of FIG. 12. Also, at least part of method 700 can be carried out by a camera, such as camera 604. In some examples, the computing device and the camera of method 700 can be two components of one device, such as discussed above in the context of computing device 602 and camera 604 of system 600. In other examples, the computing device and the camera of method 700 can be separate, communicatively-coupled components, such as discussed above in the context of computing device 602 and camera 604 of system 600.

Method 700 can begin at block 710, where the computing device can receive an input image I and an object ROI OROI. The computing device can calculate a feature vector, such as feature vector 634 for image I and object ROI OROI using a feature extractor, such as trained feature extractor 632.

At block 720, the computing device can let an integer value N, N>0, be equal to a number of photographic functions that have photographic ROIs, where the photographic ROIs will be calculated by machine learning algorithm 340 during training. Also, the computing device can let an integer value j be equal to 1.

At block 730, the computing device can determine whether j is greater than N. If j is greater than N, the computing device can proceed to block 770. Otherwise, j is less than or equal to N, and the computing device can proceed to block 740.

At block 740, the computing device can calculate photographic ROI PROI(j) for a photographic function j; e.g., one of photographic function(s) 650, using a trained rectangular regressor for photographic function j, such as one of trained rectangular regressor(s) 636. The trained rectangular regressor can calculate photographic ROI PROI(j) by operating on a feature vector, such as feature vector 634.

At block 750, the computing device can provide PROI(j) to photographic function j.

At block 760, the computing device can use photographic function j to determine photographic setting data for photographic function j. For example, the photographic setting data for photographic function j can be part of photographic setting data 660.

At block 762, the computing device can increment j; that is, set j equal to j+1. After incrementing j, the computing device can proceed to block 730.

At block 770, after calculating photographic setting data; for each of photographic functions 1 . . . N, the computing device can provide the photographic setting data for photographic functions 1 . . . N to the camera; e.g., in the context of system 600, computing device 602 can provide photographic setting data 660 to camera 604.

At block 780, the camera can receive the photographic setting data; e.g., photographic setting data 660. Then, the camera can update its photographic functions 1 . . . N using the received photographic setting data.

At block 790, after updating photographic functions 1 . . . N, the camera can capture one or more images, such as image(s) 612, using the updated photographic functions 1 . . . N.

After completing the procedures of block 790, method 700 can end. In a related method, at block 790 the camera can provide the captured images to the computing device; then, upon reception of at least one the captured image, the computing device can proceed to block 710 and re-execute method 700. Other related methods to method 700 are possible as well Method 700 can be configured with privacy controls to ensure privacy of one or more persons whose faces are present in the images processed by method 700. For example, the computing device can obtain explicit permission from each person whose face is represented by in image I of method 700 before proceeding with the remainder of method 700.

In other examples, the one or more persons whose faces are in image I of method 700 can give prior approval to perform method 700 before image I of method 700 is received at block 710, and the computing device can verify that approval as needed before performing the remainder of method 700. In still other examples, such permissions may be implicit; e.g., if the owner of a device the captured image I captures their own face and only their own face in a "selfie" image and directly or indirectly provides the selfie as image I to method 700 for executing, the owner's permission to proceed to perform method 700 solely for their own face may be inferred by providing the selfie as image I. Combinations of these privacy-related techniques and/or other techniques for ensuring privacy of persons whose faces are captured in image I and/or other images are possible as well.

Figure 8:
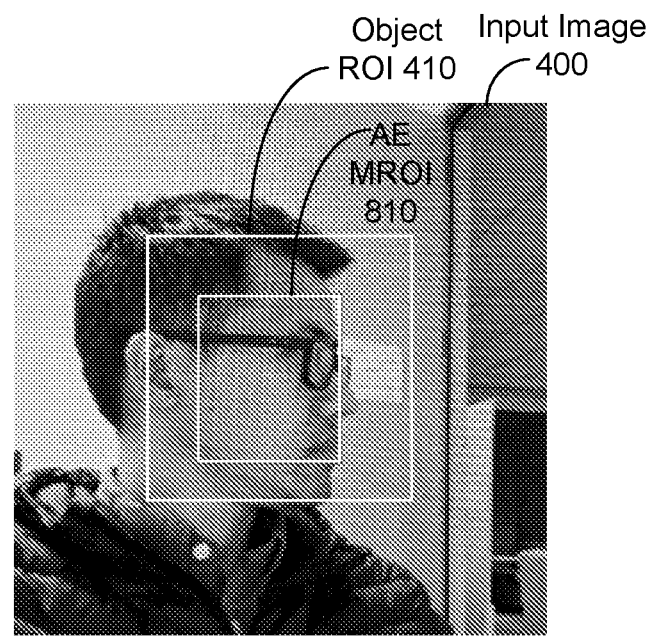
FIG. 8 illustrates the input image of FIG. 4 with different machine learning algorithm photographic regions of interest, in accordance with example embodiments.
Figure 8:
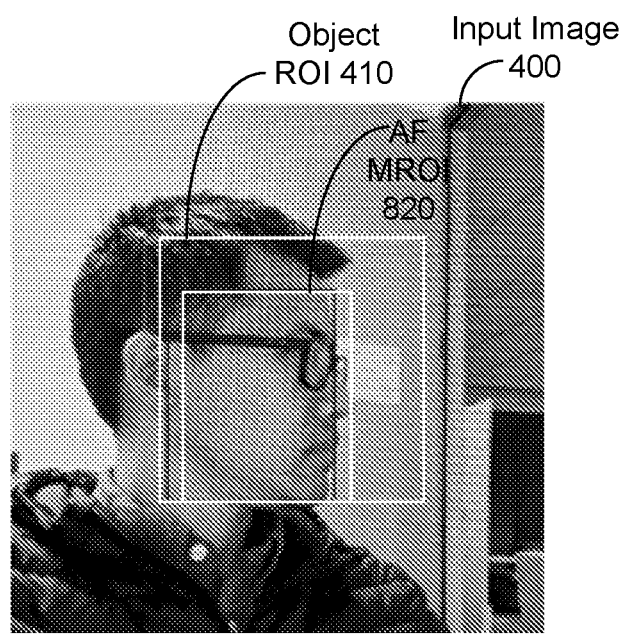

FIG. 8 illustrates input image 400 with different machine learning algorithm photographic regions of interest 810, 820 in accordance with example embodiments. At an upper portion of FIG. 8, input image 400 is shown with object ROI 410, where input image 400 and object ROI 410 are discussed above in the context of at least FIG. 4. In the example shown at the upper portion of FIG. 8, input image 400 was provided to trained machine learning algorithm 630 to predict an automatic exposure region of interest using the procedures of method 700; e.g., using at least the procedures of block 710. Then, trained machine learning algorithm 630 predicted AE MROI 810 using the procedures of method 700; e.g., using at least the procedures of block 740. AE MROI 810 is a region of interest generated using a trained automatic exposure rectangular regressor for an automatic exposure photographic function. As can be seen at the upper portion of FIG. 8, AE MROI 810 identifies more skin area and has little coverage of other portions of a face shown in input image 400 in comparison to object ROI 410. Thus, the automatic exposure photographic function of a camera using AE MROI 810 as an input to capture the environment of input image 400 should perform better in controlling exposure than the same automatic exposure photographic function of the same camera using object ROI 410 as an input.

In the example shown at a lower portion of FIG. 8, input image 400 was provided to trained machine learning algorithm 630 to predict an automatic focus region of interest using the procedures of method 700; e.g., using at least the procedures of block 710. Then, trained machine learning algorithm 630 predicted AF MROI 820 using the procedures of method 700; e.g., using at least the procedures of block 740. AF MROI 820 is a region of interest generated using a trained automatic focus rectangular regressor for an automatic focus photographic function. As can be seen at the lower portion of FIG. 8, AF MROI 820 maximizes edges of the human face shown in input image 400 relative to background aspects of input image 400 in comparison to object ROI 410. Thus, the automatic focus photographic function of a camera using AF MROI 820 as an input to capture the environment of input image 400 should perform better in controlling focus than the same automatic focus photographic function of the same camera using object ROI 410 as an input.

Figure 9:
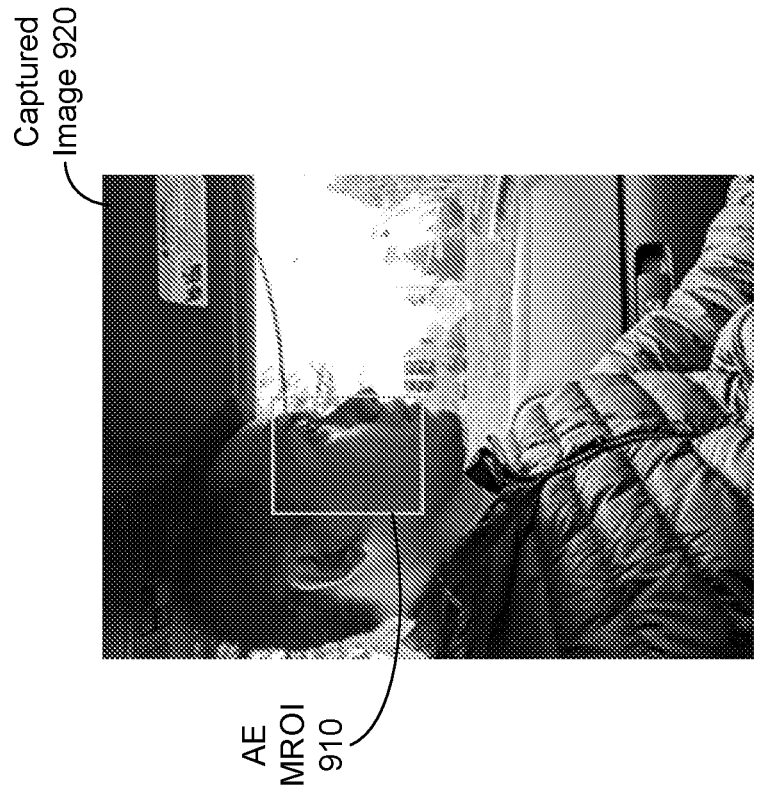
FIG. 9 illustrates an image captured using an object region of interest and another image captured using a photographic region of interest, in accordance with example embodiments.
Figure 9:
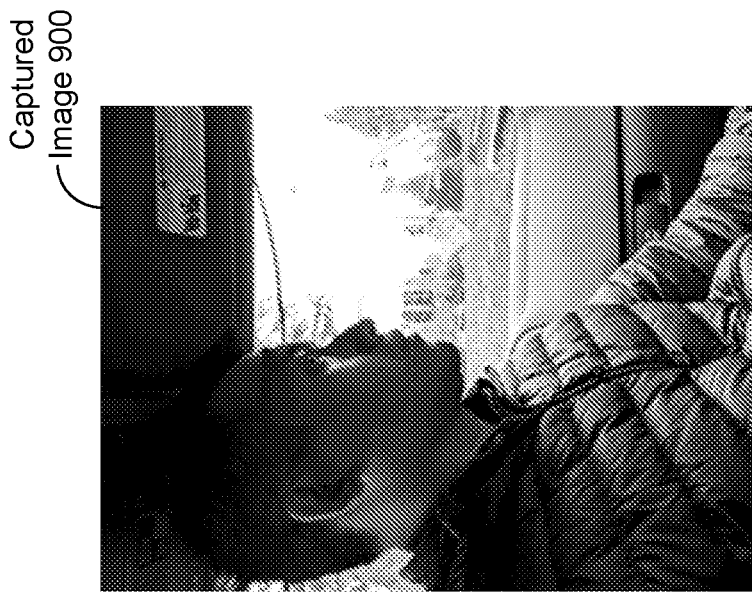

FIG. 9 illustrates captured image 900 that has been captured using an object region of interest and captured image 920 that has been captured using a photographic region of interest 910, in accordance with example embodiments. Both images 900, 920 were captured at nearly the same time using the same camera and the same photographic functions. The main distinction between captured image 900 and captured image 920 involves the input to the camera's photographic functions.

At left of FIG. 9, captured image 900 is shown after having been captured by a camera using an automatic exposure function receiving an object ROI as an input; e.g, a similar ROI to object ROI 410 for input image 400. At right of FIG. 9, captured image 920 is shown after having been captured by the same camera and the automatic exposure function used in capturing captured image 900 to capture virtually the same environment. However, the automatic exposure function used in capturing captured image 920 received AE MROI 910 as an input rather than the object ROI, where AE MROI 910 was generated by a trained automatic exposure rectangular regressor of a machine learning algorithm performing method 700 to generate photographic ROIs for the automatic exposure photographic function. FIG. 9 illustrates that a human face shown in both images 900, 920 is rendered darker and with fewer details in captured image 900 in comparison to captured image 920, and so captured image 920 appears to be more detailed and color balanced than captured image 900.

Example Data Network

Figure 10:
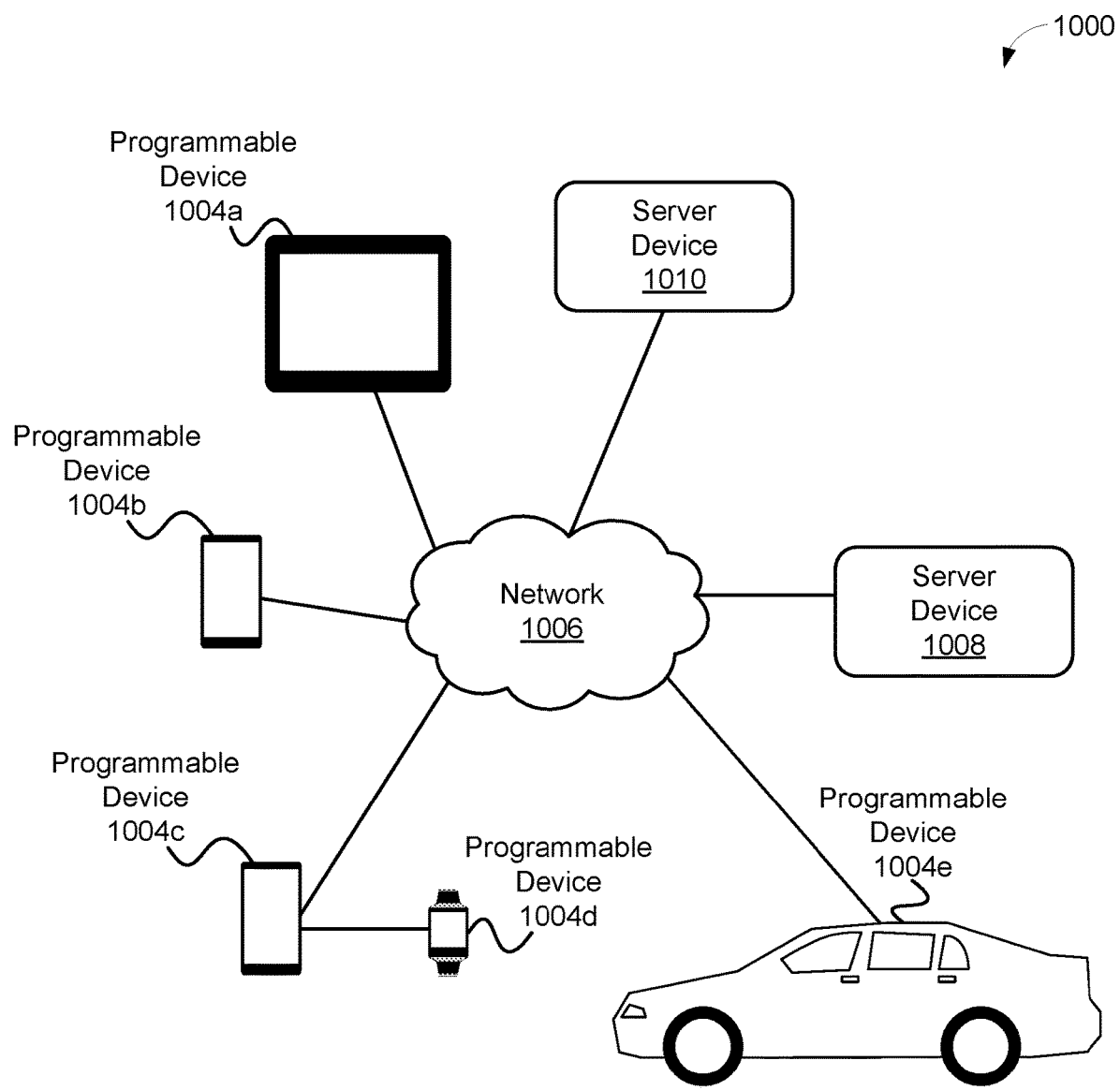
FIG. 10 depicts a distributed computing architecture, in accordance with example embodiments.

FIG. 10 depicts distributed computing architecture 1000, in accordance with example embodiments. Distributed computing architecture 1000 includes server devices 1008, 1010 that are configured to communicate, via network 1006, with programmable devices 1004a, 1004b, 1004c, 1004d, 1004e. Network 1006 may correspond to a local area network (LAN), a wide area network (WAN), a wireless LAN (WLAN), a wireless WAN (WWAN), a corporate intranet, the public Internet, or any other type of network configured to provide a communications path between networked computing devices. Network 1006 may also correspond to a combination of one or more LANs, WANs, corporate intranets, and/or the public Internet.

Although FIG. 10 shows two server devices and five programmable devices, distributed application architectures may serve more or fewer programmable devices using more or fewer server devices than illustrated. Moreover, programmable devices 1004a, 1004b, 1004c, 1004d, 1004e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 1004a, 1004b, 1004c, 1004e, programmable devices can be directly connected to network 1006. In other examples, such as illustrated by programmable device 1004d, programmable devices can be indirectly connected to network 1006 via an associated computing device, such as programmable device 1004c. In this example, programmable device 1004c can act as an associated computing device to pass electronic communications between programmable device 1004d and network 1006. In other examples, such as illustrated by programmable device 1004e, a computing device can be part of and/or inside a vehicle, such as a car, a truck, a bus, a boat or ship, an airplane, etc. In other examples not shown in FIG. 10, a programmable device can be both directly and indirectly connected to network 1006.

Server devices 1008, 1010 can be configured to perform one or more services, as requested by programmable devices 1004a-1004e. For example, server device 1008 and/or 1010 can provide content to programmable devices 1004a-1004e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1008 and/or 1010 can provide programmable devices 1004a-1004e with access to software for database, search, computation, graphical, audio, video, World Wide Web/Internet utilization, and/or other functions. Many other examples of server devices are possible as well.

Computing Device Architecture

Figure 11:
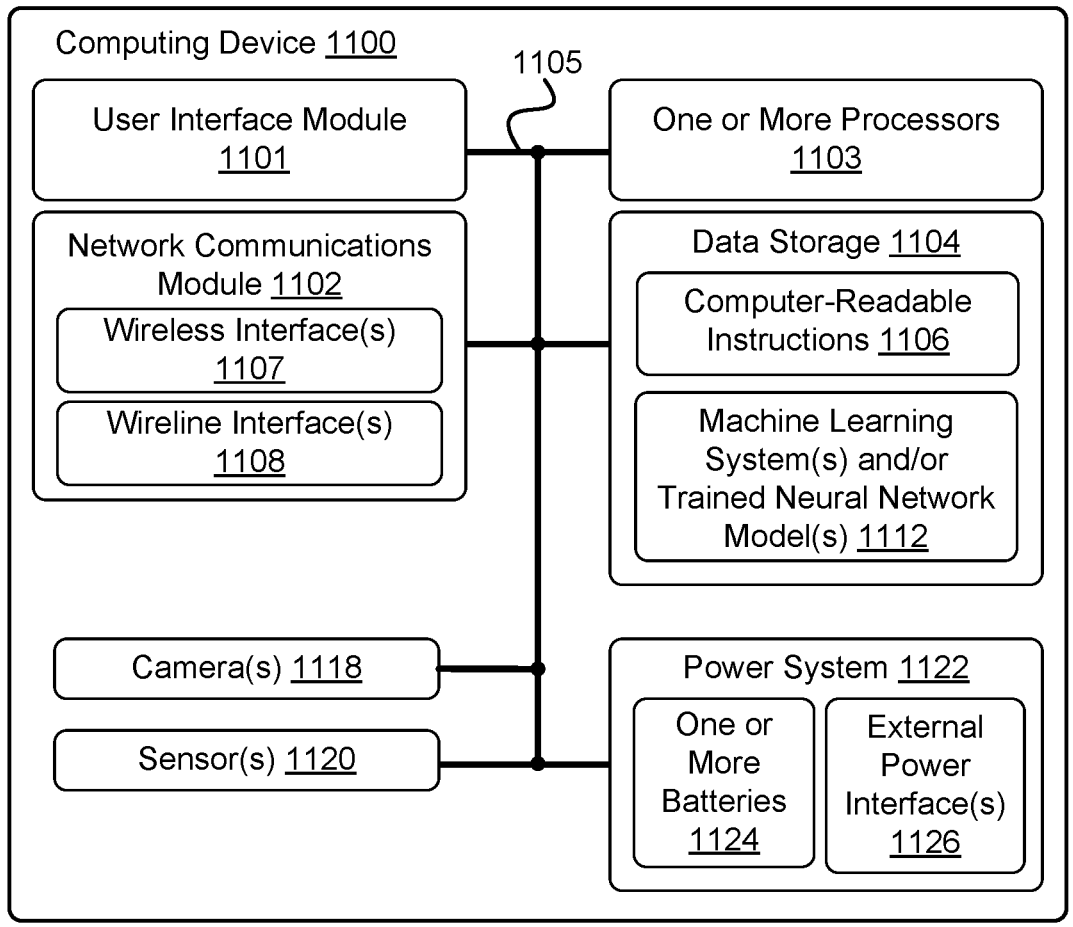
FIG. 11 is a block diagram of a computing device, in accordance with example embodiments.

FIG. 11 is a block diagram of a computing device 1100, in accordance with example embodiments. In particular, computing device 1100 shown in FIG. 11 can be configured to perform at least one function of and/or related to a computing device, a camera, an image, a photographic region of interest, images 100, 400, 900, 920, systems 200, 300, 600, distributed computing architecture 1000, and/or methods 500, 700, 1300.

Computing device 1100 may include a user interface module 1101, a network communications module 1102, one or more processors 1103, data storage 1104, one or more cameras 1118, one or more sensors 1120, and power system 1122, all of which may be linked together via a system bus, network, or other connection mechanism 1105.

User interface module 1101 can be operable to send data to and/or receive data from external user input/output devices. For example, user interface module 1101 can be configured to send and/or receive data to and/or from user input devices such as a touch screen, a computer mouse, a keyboard, a keypad, a touch pad, a track ball, a joystick, a voice recognition module, and/or other similar devices. User interface module 1101 can also be configured to provide output to user display devices, such as one or more screens (including touch screens), cathode ray tubes (CRT), liquid crystal displays, light emitting diodes (LEDs), displays using digital light processing (DLP) technology, printers, light bulbs, and/or other similar devices. User interface module 1101 can also be configured to generate audible outputs, with devices such as a speaker, speaker jack, audio output port, audio output device, earphones, and/or other similar devices. User interface module 1101 can further be configured with one or more haptic devices that can generate haptic outputs, such as vibrations and/or other outputs detectable by touch and/or physical contact with computing device 1100. In some examples, user interface module 1101 can be used to provide a graphical user interface (GUI) for utilizing computing device 1100.

Network communications module 1102 can include one or more devices that provide one or more wireless interfaces 1107 and/or one or more wireline interfaces 1108 that are configurable to communicate via a network. Wireless interface(s) 1107 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interface(s) 1108 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 1102 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 1103 can include one or more general purpose processors, on-device coprocessors, and/or special purpose processors (e.g., one or more central processing units (CPUs), DSPs, GPUs, TPUs, and/or ASICs). One or more processors 1103 can be configured to execute computer-readable instructions 1106 that are contained in data storage 1104 and/or other instructions as described herein.

Data storage 1104 can include one or more non-transitory computer-readable storage media that can be read and/or accessed by at least one of one or more processors 1103. The one or more non-transitory computer-readable storage media can include volatile and/or non-volatile storage components, such as optical, magnetic, organic or other memory or disc storage, which can be integrated in whole or in part with at least one of one or more processors 1103. In some examples, data storage 1104 can be implemented using a single physical device (e.g., one optical, magnetic, organic or other memory or disc storage unit), while in other examples, data storage 1104 can be implemented using two or more physical devices.

Data storage 1104 can include computer-readable instructions 1106 and perhaps additional data. In some examples, data storage 1104 can include storage required to perform at least part of the herein-described methods, scenarios, and techniques and/or at least part of the functionality of the herein-described devices and networks. In some examples, data storage 1104 can include storage for one or more machine learning systems and/or one or more trained machine learning models 1112 (e.g., one or more untrained, partially trained, and/or completely trained machine learning systems, such as one or more instances of machine learning algorithm 340 and/or trained machine learning algorithm 630). In particular of these examples, computer-readable instructions 1106 can include instructions that, when executed by processor(s) 1103, enable computing device 1100 to provide some or all of the functionality of one or more machine learning systems and/or one or more trained machine learning models 1112.

In some examples, computing device 1100 can include camera(s) 1118. Camera(s) 1118 can include one or more image capture devices, such as still and/or video cameras, equipped to capture light and record the captured light in one or more images; that is, camera(s) 1118 can generate image(s) of captured light. The one or more images can be one or more still images and/or one or more images utilized in video imagery. Camera(s) 1118 can capture light and/or electromagnetic radiation emitted as visible light, infrared radiation, ultraviolet light, and/or as one or more other frequencies of light. In some examples, one or more cameras of camera(s) 1118 can perform at least the features of camera 604.

In some examples, computing device 1100 can include one or more sensors 1120. Sensors 1120 can be configured to measure conditions within computing device 1100 and/or conditions in an environment of computing device 1100 and provide data about these conditions. For example, sensors 1120 can include one or more of: (i) sensors for obtaining data about computing device 1100, such as, but not limited to, a thermometer for measuring a temperature of computing device 1100, a battery sensor for measuring power of one or more batteries of power system 1122, and/or other sensors measuring conditions of computing device 1100; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 1100, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 1100, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 1100, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 1120 are possible as well.

Power system 1122 can include one or more batteries 1124 and/or one or more external power interfaces 1126 for providing electrical power to computing device 1100. Each battery of the one or more batteries 1124 can, when electrically coupled to the computing device 1100, act as a source of stored electrical power for computing device 1100. One or more batteries 1124 of power system 1122 can be configured to be portable. Some or all of one or more batteries 1124 can be readily removable from computing device 1100. In other examples, some or all of one or more batteries 1124 can be internal to computing device 1100, and so may not be readily removable from computing device 1100. Some or all of one or more batteries 1124 can be rechargeable. For example, a rechargeable battery can be recharged via a wired connection between the battery and another power supply, such as by one or more power supplies that are external to computing device 1100 and connected to computing device 1100 via the one or more external power interfaces. In other examples, some or all of one or more batteries 1124 can be non-rechargeable batteries.

One or more external power interfaces 1126 of power system 1122 can include one or more wired-power interfaces, such as a USB cable and/or a power cord, that enable wired electrical power connections to one or more power supplies that are external to computing device 1100. One or more external power interfaces 1126 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 1126, computing device 1100 can draw electrical power from the external power source the established electrical power connection. In some examples, power system 1122 can include related sensors, such as battery sensors associated with the one or more batteries or other types of electrical power sensors.

Cloud-Based Servers

Figure 12:
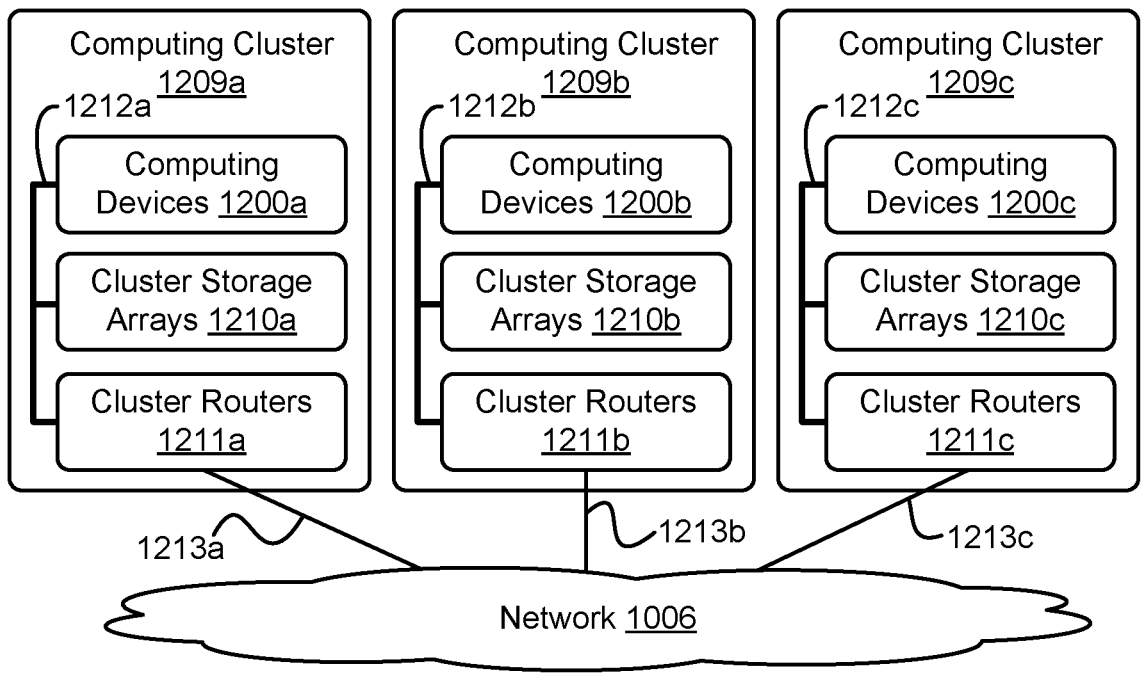
FIG. 12 depicts a network of computing clusters arranged as a cloud-based server system, in accordance with example embodiments.

FIG. 12 depicts network 1006 of computing clusters 1209a, 1209b, 1209c arranged as a cloud-based server system in accordance with an example embodiment. Computing clusters 1209a, 1209b, 1209c can be cloud-based devices that store program logic and/or data of cloud-based applications and/or services; e.g., perform at least one function of and/or related to a computing device, a camera, an image, a photographic region of interest, images 100, 400, 900, 920, systems 200, 300, 600, distributed computing architecture 1000, and/or methods 500, 700, 1300.

In some embodiments, computing clusters 1209a, 1209b, 1209c can be a single computing device residing in a single computing center. In other embodiments, computing clusters 1209a, 1209b, 1209c can include multiple computing devices in a single computing center, or even multiple computing devices located in multiple computing centers located in diverse geographic locations. For example, FIG. 12 depicts each of computing clusters 1209a, 1209b, and 1209c residing in different physical locations.

In some embodiments, data and services at computing clusters 1209a, 1209b, 1209c can be encoded as computer readable information stored in non-transitory, tangible computer readable media (or computer readable storage media) and accessible by other computing devices. In some embodiments, computing clusters 1209a, 1209b, 1209c can be stored on a single disk drive or other non-transitory, tangible storage media, or can be implemented on multiple disk drives or other tangible storage media located at one or more diverse geographic locations.

FIG. 12 depicts a cloud-based server system, in accordance with example embodiments. In FIG. 12, functionality of system 300, system 600, a camera, and/or a computing device can be distributed among computing clusters 1209a, 1209b, 1209c. Computing cluster 1209a can include one or more computing devices 1200a, cluster storage arrays 1210a, and cluster routers 1211a connected by a local cluster network 1212a. Similarly, computing cluster 1209b can include one or more computing devices 1200b, cluster storage arrays 1210b, and cluster routers 1211b connected by a local cluster network 1212b. Likewise, computing cluster 1209c can include one or more computing devices 1200c, cluster storage arrays 1210c, and cluster routers 1211c connected by a local cluster network 1212c.

In some embodiments, each of computing clusters 1209a, 1209b, and 1209c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1209a, for example, computing devices 1200a can be configured to perform various computing tasks of system 300, system 600, a camera, and/or a computing device. In one embodiment, the various functionalities of system 300, system 600, a camera, and/or a computing device can be distributed among one or more of computing devices 1200a, 1200b, 1200c. Computing devices 1200b and 1200c in respective computing clusters 1209b and 1209c can be configured similarly to computing devices 1200a in computing cluster 1209a. On the other hand, in some embodiments, computing devices 1200a, 1200b, and 1200c can be configured to perform different functions.

In some embodiments, computing tasks and stored data associated with system 300, system 600, a camera, and/or a computing device can be distributed across computing devices 1200a, 1200b, and 1200c based at least in part on the processing requirements of system 300, system 600, a camera, and/or a computing device, the processing capabilities of computing devices 1200a, 1200b, 1200c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 1210*a*, 1210*b*, 1210*c* of computing clusters 1209*a*, 1209*b*, 1209*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of system 300, system 600, a camera, and/or a computing device can be distributed across computing devices 1200*a*, 1200*b*, 1200*c* of computing clusters 1209*a*, 1209*b*, 1209*c*, various active portions and/or backup portions of these components can be distributed across cluster storage arrays 1210*a*, 1210*b*, 1210*c*. For example, some cluster storage arrays can be configured to store one portion of the data of system 300, system 600, a camera, and/or a computing device, while other cluster storage arrays can store other portion(s) of data of system 300, system 600, a camera, and/or a computing device. Additionally, some cluster storage arrays can be configured to store backup versions of data stored in other cluster storage arrays.

Cluster routers 1211*a*, 1211*b*, 1211*c* in computing clusters 1209*a*, 1209*b*, 1209*c* can include networking equipment configured to provide internal and external communications for the computing clusters. For example, cluster routers 1211*a* in computing cluster 1209*a* can include one or more internet switching and routing devices configured to provide (i) local area network communications between computing devices 1200*a* and cluster storage arrays 1210*a* via local cluster network 1212*a*, and (ii) wide area network communications between computing cluster 1209*a* and computing clusters 1209*b* and 1209*c* via wide area network link 1213*a* to network 1006. Cluster routers 1211*b* and 1211*c* can include network equipment similar to cluster routers 1211*a*, and cluster routers 1211*b* and 1211*c* can perform similar networking functions for computing clusters 1209*b* and 1209*b* that cluster routers 1211*a* perform for computing cluster 1209*a*.

In some embodiments, the configuration of cluster routers 1211*a*, 1211*b*, 1211*c* can be based at least in part on the data communication requirements of the computing devices and cluster storage arrays, the data communications capabilities of the network equipment in cluster routers 1211*a*, 1211*b*, 1211*c*, the latency and throughput of local cluster networks 1212*a*, 1212*b*, 1212*c*, the latency, throughput, and cost of wide area network links 1213*a*, 1213*b*, 1213*c*, and/or other factors that can contribute to the cost, speed, fault-tolerance, resiliency, efficiency and/or other design criteria of the moderation system architecture.

Example Methods of Operation

Figure 13:
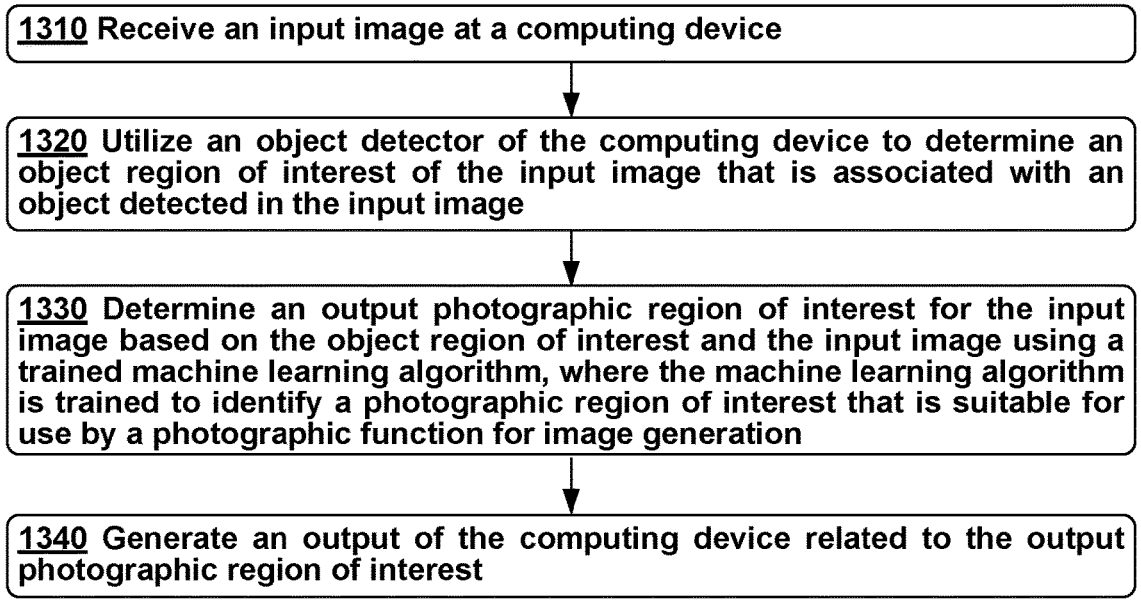
FIG. 13 is a flowchart of another method, in accordance with example embodiments.

FIG. 13 is a flowchart of method 1300, in accordance with example embodiments. Method 1300 can be a computer-implemented method. For example, method 1300 can be executed by a computing device, such as computing device 1100.

Method 1300 can begin at block 1310, where the computing device can receive an input image, such as discussed above at least in the context of FIGS. 1 and 3-7.

At block 1320, an object detector of the computing device can be utilized to determine an object region of interest of the input image that is associated with an object detected in the input image, such as discussed above at least in the context of FIGS. 1 and 3-7.

At block 1330, a trained machine learning algorithm can be used to determine an output photographic region of interest for the input image based on the object region of interest and the input image, where the machine learning algorithm can be trained to identify a photographic region of interest that is suitable for use by a photographic function for image generation, such as discussed above at least in the context of FIGS. 3-7.

At block 1340, an output of the computing device related to the output photographic region of interest can be generated, such as discussed above at least in the context of FIGS. 6 and 7.

In some examples, the computing device can be associated with a camera and generating the output of the computing device can include: providing the output photographic region of interest to the camera; and performing the photographic function by the camera utilizing the output photographic region of interest, such as discussed above at least in the context of FIGS. 6 and 7.

In some examples, generating the output of the computing device can further include: after performing the photographic function by the camera, capturing a second image of the object using the camera; and providing an output of the computing device that includes the second image, such as discussed above at least in the context of FIGS. 6 and 7.

In some examples, the photographic function can include one or more of: an automatic focus function, an automatic exposure function, a face detection function, and/or an automatic white balance function, such as discussed above at least in the context of FIGS. 3-7.

In some examples, the output photographic region of interest can include a rectangular region of interest, such as discussed above at least in the context of FIGS. 3-7.

In some examples, the trained machine learning algorithm can include a feature extractor configured to extract features from the input image for use in determining one or more photographic regions of interest that include the output photographic region of interest, such as discussed above at least in the context of FIGS. 3-7.

In some examples, the trained machine learning algorithm can include one or more regressors associated with one or more photographic functions and the one or more regressors can be configured to determine the one or more photographic regions of interest based on the features extracted by the feature extractor, such as discussed above at least in the context of FIGS. 3-7.

In some examples, method 1300 can further include: determining a ground-truth region of interest based on the object region of interest; utilizing the machine learning algorithm to determine the output photographic region of interest for the photographic function; and training the machine learning algorithm based on a comparison between the output photographic region of interest with the ground-truth region of interest, such as discussed above at least in the context of FIGS. 3-5.

In some examples, determining the ground-truth region of interest can include exhaustively searching the object region of interest to determine the ground-truth region of interest, such as discussed above at least in the context of FIGS. 3-5.

In some examples, exhaustively searching the object region of interest to determine the ground-truth region of interest can include: determining a plurality of estimated ground-truth regions of interest within the object region of interest; determining a mask of the input image associated with the photographic function; and selecting the ground-truth region of interest from the plurality of estimated ground-truth regions of interest based on an intersection between the ground-truth region of interest and the mask, such as discussed above at least in the context of FIGS. 3-5.

In some examples, selecting the ground-truth region of interest from the plurality of estimated ground-truth regions of interest based on the intersection between the ground-truth region of interest and the mask can include: selecting the ground-truth region of interest from the plurality of estimated ground-truth regions of interest based on a ratio of the intersection between the ground-truth region of interest and the mask to a union of the ground-truth region of interest and the mask, such as discussed above at least in the context of FIGS. 3-5.

In some examples, determining the mask of the input image associated with the photographic function can include determining the mask by applying a transformation related to the photographic function to the object region of interest of the input image, such as discussed above at least in the context of FIGS. 3-5.

In some examples, the photographic function can include an automatic exposure function, and the transformation can be related to maximizing skin-colored area coverage, such as discussed above at least in the context of FIGS. 3-5.

In some examples, the photographic function can include an automatic focus function and where the transformation can be related to depth values associated with one or more points on the object, such as discussed above at least in the context of FIGS. 3-5.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

Variations of the above referenced approach will be apparent to the skilled person. For example, while the above description provides particular disclosure of corrections to distortion of faces in an image, the approach may also be applied to other regions or objects of interest. As such, where the adjective "facial" is referred to in the above disclosure (such as in the phrases "facial regions" or "facial transformation"), the skilled person will appreciate that alternative approaches may be adopted in which such an adjective is not required. Similarly, references to "face-related costs", "face-related transformations" or other "face-related" features may be more generally considered as "object-related" or "region-related" in alternative implementations.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A computer-implemented method, comprising:
receiving an input image at a computing device, wherein the computing device is configured to apply a plurality of photographic functions to the input image;
utilizing an object detector of the computing device to determine an object region of interest of the input image that is associated with an object detected in the input image;
determining, for a particular photographic function of the plurality of photographic functions, an output photographic region of interest for the input image based on the object region of interest and the input image using a trained machine learning algorithm, the machine learning algorithm shaving been trained to identify a photographic region of interest that when used in place of the object region of interest is suitable for obtaining improved image generation when used by the particular photographic function; and generating an output of the computing device related to the output photographic region of interest.

2. The computer-implemented method of claim 1, wherein the computing device is associated with a camera, and wherein generating the output of the computing device comprises:
providing the output photographic region of interest to the camera; and
performing the particular photographic function by the camera utilizing the output photographic region of interest.

3. The computer-implemented method of claim 2, wherein
generating the output of the computing device further comprises:
after performing the particular photographic function by the camera, capturing a second image of the object using the camera; and
providing an output of the computing device that comprises the second image.

4. The computer-implemented method of claim 1, wherein the particular photographic function comprises one or more of: an automatic focus function, an automatic exposure function, a face detection function, and/or an automatic white balance function.

5. The computer-implemented method of claim 1, wherein the output photographic region of interest comprises a rectangular region of interest.

6. The computer-implemented method of claim 1, wherein the trained machine learning algorithm comprises a feature extractor configured to extract features from the input image for use in determining one or more photographic regions of interest that include the output photographic region of interest.

7. The computer-implemented method of claim 6, wherein the trained machine learning algorithm comprises one or more regressors associated with one or more photographic functions, the one or more regressors configured to determine the one or more photographic regions of interest based on the features extracted by the feature extractor.

8. The computer-implemented method of claim 1, further comprising:
determining a ground-truth region of interest based on the object region of interest;
utilizing the machine learning algorithm to determine the output photographic region of interest for the particular photographic function; and
training the machine learning algorithm based on a comparison between the output photographic region of interest and the ground-truth region of interest.

9. The computer-implemented method of claim 8, wherein the ground-truth region of interest is associated with the particular photographic function.

10. The computer-implemented method of claim 8, wherein the training of the machine learning algorithm is based on a loss function associated with the particular photographic function.

11. The computer-implemented method of claim 8, wherein determining the ground-truth region of interest comprises exhaustively searching the object region of interest to determine the ground-truth region of interest.

12. The computer-implemented method of claim 11, wherein exhaustively searching the object region of interest to determine the ground-truth region of interest comprises:
determining a plurality of estimated ground-truth regions of interest within the object region of interest;
determining a mask of the input image associated with the particular photographic function; and
selecting the ground-truth region of interest from the plurality of estimated ground-truth regions of interest based on an intersection between the ground-truth region of interest and the mask.

13. The computer-implemented method of claim 12, wherein selecting the ground-truth region of interest from the plurality of estimated ground-truth regions of interest based on the intersection between the ground-truth region of interest and the mask comprises:
selecting the ground-truth region of interest from the plurality of estimated ground-truth regions of interest based on a ratio of the intersection between the ground-truth region of interest and the mask to a union of the ground-truth region of interest and the mask.

14. The computer-implemented method of claim 12, wherein determining the mask of the input image associated with the particular photographic function comprises determining the mask by applying a transformation related to the particular photographic function to the object region of interest of the input image.

15. The computer-implemented method of claim 14, wherein the particular photographic function comprises an automatic exposure function, and wherein the transformation is related to maximizing skin-colored area coverage.

16. The computer-implemented method of claim 14, wherein the particular photographic function comprises an automatic focus function, and wherein the transformation is related to depth values associated with one or more points on the object.

17. The computer-implemented method of claim 1, further comprising:
determining, for the input image, a first output photographic region of interest corresponding to a first photographic function, and a second output photographic region of interest corresponding to a second photographic function; and
processing the input image based on the first output photographic region of interest and the second output photographic region of interest.

18. The computer-implemented method of claim 1, wherein the output photographic region of interest is different from the object region of interest.

19. A computing device, comprising:
one or more processors; and
one or more computer readable media having computer-readable instructions stored thereon that, when executed by the one or more processors, cause the computing device to carry out functions that comprise:
receiving an input image at the computing device, wherein the computing device is configured to apply a plurality of photographic functions to the input image;
utilizing an object detector of the computing device to determine an object region of interest of the input image that is associated with an object detected in the input image;
determining, for a particular photographic function of the plurality of photographic functions, an output photographic region of interest for the input image based on the object region of interest and the input image using a trained machine learning algorithm, the machine learning algorithm having been trained to identify a photographic region of interest that when used in place of the object region of interest is suitable for obtaining improved image generation when used by the particular photographic function; and generating an output of the computing device related to the output photographic region of interest.

20. An article of manufacture comprising one or more non-transitory computer readable media having computer-readable instructions stored thereon that, when executed by one or more processors of a computing device, cause the computing device to carry out functions that comprise:

receiving an input image at the computing device, wherein the computing device is configured to apply a plurality of photographic functions to the input image;

utilizing an object detector of the computing device to determine an object region of interest of the input image that is associated with an object detected in the input image;

determining, for a particular photographic function of the plurality of photographic functions, an output photographic region of interest for the input image based on the object region of interest and the input image using a trained machine learning algorithm, the machine learning algorithm having been trained to identify a photographic region of interest that when used in place of the object region of interest is suitable for obtaining improved image generation when used by the particular photographic function; and generating an output of the computing device related to the output photographic region of interest.

* * * * *

UNITED STATES PATENT AND TRADEMARK OFFICE
CERTIFICATE OF CORRECTION

PATENT NO. : 12,056,925 B2
APPLICATION NO. : 17/299188
DATED : August 6, 2024
INVENTOR(S) : Ryan Geiss, Ruiduo Yang and Marc Levoy Page 1 of 2

It is certified that error appears in the above-identified patent and that said Letters Patent is hereby corrected as shown below:

In the Claims

Line 1 Claim 1 delete:
"A computer-implemented method, comprising:
receiving an input image at a computing device, wherein the computing device is configured to apply a plurality of photographic functions to the input image;
utilizing an object detector of the computing device to determine an object region of interest of the input image that is associated with an object detected in the input image;
determining, for a particular photographic function of the plurality of photographic functions, an output photographic region of interest for the input image based on the object region of interest and the input image using a trained machine learning algorithm, the machine learning algorithm shaving been trained to identify a photographic region of interest that when used in place of the object region of interest is suitable for obtaining improved image generation when used by the particular photographic function; and
generating an output of the computing device related to the output photographic region of interest."

And insert:
--A computer-implemented method, comprising:
receiving an input image at a computing device, wherein the computing device is configured to apply a plurality of photographic functions to the input image;
utilizing an object detector of the computing device to determine an object region of interest of the input image that is associated with an object detected in the input image;
determining, for a particular photographic function of the plurality of photographic functions, an output photographic region of interest for the input image based on the object region of interest and the input image using a trained machine learning algorithm, the machine learning algorithm having been trained to identify a photographic region of interest that when used in place of the object region of interest is suitable for obtaining improved image generation when used by the particular Signed and Sealed this
Eleventh Day of November, 2025

John A. Squires
*Director of the United States Patent and Trademark Office*

CERTIFICATE OF CORRECTION (continued)
U.S. Pat. No. 12,056,925 B2 photographic function; and
generating an output of the computing device related to the output photographic region of interest.--